(12) United States Patent
Evans et al.

(10) Patent No.: US 10,549,191 B2
(45) Date of Patent: Feb. 4, 2020

(54) APPLICATION-CENTRIC USER INTERFACE TECHNIQUES

(71) Applicant: Microsoft Technology Licensing, LLC, Redmond, WA (US)

(72) Inventors: C. Shane Evans, Duvall, WA (US); Roderick M. Toll, Sammamish, WA (US); G. Andrew Johnston, II, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 15/475,380

(22) Filed: Mar. 31, 2017

(65) Prior Publication Data

US 2017/0206094 A1    Jul. 20, 2017

Related U.S. Application Data

(63) Continuation of application No. 13/525,309, filed on Jun. 16, 2012, now Pat. No. 9,610,498, which is a
(Continued)

(51) Int. Cl.
*A63F 13/48* (2014.01)
*A63F 13/795* (2014.01)
(Continued)

(52) U.S. Cl.
CPC .......... *A63F 13/48* (2014.09); *A63F 13/493* (2014.09); *A63F 13/533* (2014.09); *A63F 13/77* (2014.09); *A63F 13/792* (2014.09); *A63F 13/795* (2014.09); *A63F 13/87* (2014.09); *G06T 11/60* (2013.01); *A63F 2300/308* (2013.01); *A63F 2300/572* (2013.01)

(58) Field of Classification Search
CPC ...... A63F 13/48; A63F 13/493; A63F 13/533; A63F 13/77; A63F 13/792; A63F 13/87; A63F 13/12; A63F 2300/308; A63F 2300/572; G06F 9/451; G06T 11/60
See application file for complete search history.

(56) References Cited

U.S. PATENT DOCUMENTS 5,349,658 A    9/1994   O'Rourke et al.
5,497,422 A    3/1996   Tysen
(Continued)

FOREIGN PATENT DOCUMENTS

GB    2359450 A     8/2001
JP    2002-536754   10/2002
(Continued)

OTHER PUBLICATIONS

*An introduction to the Zenwork Application Launcher*, http://builder.com/articele.jhtml?id=t01720001121kac20.htm, 1-2, visited Jan. 6, 2003.
(Continued)

*Primary Examiner* — Corbett B Coburn

(57) ABSTRACT

Various application-centric user interface techniques are described. A user can easily launch, add, or update applications. An application-centric activity center can be presented as part of a user interface for an operating system shell. A file defining metadata for an application can be defined. The techniques can be applied to game-related software.

20 Claims, 41 Drawing Sheets

Related U.S. Application Data continuation of application No. 12/750,602, filed on Mar. 30, 2010, now Pat. No. 8,245,534, which is a continuation of application No. 10/402,346, filed on Mar. 27, 2003, now Pat. No. 7,846,023.

(51) Int. Cl.

| | | |
|---|---|---|
| *A63F 13/77* | (2014.01) | |
| *A63F 13/533* | (2014.01) | |
| *A63F 13/792* | (2014.01) | |
| *A63F 13/87* | (2014.01) | |
| *G06T 11/60* | (2006.01) | |
| *A63F 13/493* | (2014.01) | |

(56) References Cited

U.S. PATENT DOCUMENTS

| | | | |
|---|---|---|---|
| 5,761,655 | A | 6/1998 | Hoffman |
| 5,784,001 | A | 7/1998 | Deluca |
| 5,892,904 | A | 4/1999 | Atkinson |
| 5,905,496 | A | 5/1999 | Lau et al. |
| 5,963,964 | A | 10/1999 | Nielsen |
| 5,987,513 | A | 11/1999 | Prithviraj |
| 6,322,451 | B1 | 11/2001 | Miura |
| 6,345,288 | B1 | 2/2002 | Reed |
| 6,353,926 | B1 | 3/2002 | Parthesarathy et al. |
| 6,417,869 | B1 | 7/2002 | Do |
| 6,456,307 | B1 | 9/2002 | Bates et al. |
| 6,651,091 | B1 | 11/2003 | McBrearty |
| 6,686,936 | B1 | 2/2004 | Nason |
| 6,810,149 | B1 | 10/2004 | Squilla et al. |
| 7,056,217 | B1 | 6/2006 | Pelkey et al. |
| 7,509,377 | B2 | 3/2009 | Harvey |
| 7,549,924 | B2 | 6/2009 | Canessa et al. |
| 7,846,023 | B2 | 12/2010 | Evans et al. |
| 7,972,215 | B2 | 7/2011 | Evans et al. |
| 8,234,591 | B1 | 7/2012 | Dhawan et al. |
| 8,245,534 | B2 | 8/2012 | Evans et al. |
| 8,465,370 | B2 | 6/2013 | Evans et al. |
| 8,475,281 | B2 | 7/2013 | Evans et al. |
| 8,734,259 | B2 | 5/2014 | Evans et al. |
| 9,610,498 | B2 | 4/2017 | Evans et al. |
| 2001/0018365 | A1 | 8/2001 | Orui |
| 2002/0026388 | A1 | 2/2002 | Roebuck |
| 2002/0027495 | A1 | 3/2002 | Darby, Jr. |
| 2002/0054138 | A1 | 5/2002 | Hennum |
| 2002/0137565 | A1 | 9/2002 | Blanco |
| 2002/0142842 | A1 | 10/2002 | Easley et al. |
| 2002/0172842 | A1 | 11/2002 | Honda et al. |
| 2002/0194258 | A1 | 12/2002 | White |
| 2002/0196279 | A1 | 12/2002 | Bloomfield et al. |
| 2003/0001907 | A1 | 1/2003 | Bergsten |
| 2003/0110384 | A1 | 6/2003 | Carr |
| 2003/0220984 | A1 | 11/2003 | Jones |
| 2004/0051726 | A1* | 3/2004 | Martyn .............. G06F 3/0482 715/700 |
| 2004/0117378 | A1 | 6/2004 | Manandhar |
| 2005/0071477 | A1 | 3/2005 | Evans et al. |

FOREIGN PATENT DOCUMENTS

| | | |
|---|---|---|
| JP | 2004-295869 | 10/2004 |
| WO | WO 97/41508 | 11/1997 |
| WO | WO 97/50036 | 12/1997 |
| WO | WO 01/18636 | 3/2001 |
| WO | WO 01/61508 | 8/2001 |
| WO | WO 01/71491 | 9/2001 |
| WO | WO 03/003186 | 1/2003 |

OTHER PUBLICATIONS

Bailey, "Maximum RPM—Taking the Red Hat Package Manager to the Limit," Feb. 17, 1997, 94 pages, http://www.rpm.org/maximum-rpm.ps.gz.

China First Office Action, Application No. 200410033060.X, dated Oct. 10, 2008.

China Notice on Grant of Patent Right for Invention dated Dec. 26, 2008, in Application No. 200410039768.6, 4 pages.

China Notice on Grant of Patent Right for Invention dated Jun. 11, 2010, in Application No. 200410033060.X, 4 pages.

China Second Office Action dated Aug. 7, 2009, in Application No. 200410033060.X, 9 pages.

China Second Office Action, Application No. 200410039768.6, dated Dec. 21, 2007.

China Third Office Action dated Aug. 1, 2008, in Application No. 200410039768.6, 7 pages.

China Third Office Action dated Mar. 24, 2010, in Application No. 200410033060.X, 7 pages.

CNET Network Press Release, "CNET Networks Creates With LaunchPad Download Express," Mar. 11, 2002, 2 pages, http://pressreleases, cnetnetworks.com/phoenix.zhtml?c=67325&p=irol-newsArticle_Print&ID267174&highlight.

*Configuring Launcher*, http://www.adventnet.com/products/t11/help/getting_started/launcher/tcatsconflaun.html, 2 pages, visited Jan. 6, 2003.

English translation of Chinese Examination Report for foreign counterpart Chinese Application No. 200410039768.6, dated Apr. 27, 2007, 7 pages.

EP Communication, Reference EP30040RK900df, Application No. 04004873.8-1525, dated Apr. 13, 2006.

EPO Registered Letter Ref EP29969TE900df, for Application No. 04004992.6-2224, dated May 18, 2010.

EPO Search Report dated Oct. 25, 2007, Application No. 04004992.6, 9 pages.

European Application 04004992.6, Communication dated Jan. 31, 2014, 7 pages.

European Application 04004992.6, Communication dated Feb. 6, 2014, 59 pages.

European Communication dated Mar. 13, 2013, in Application No. 04004992.6 (7 pages).

European Communication dated Aug. 23, 2007, in Application No. 04004873.8, 4 pages.

European Communication dated Aug. 24, 2004, in Application No. 04004873.8, 2 pages.

European Decision to Grant a European Patent dated Apr. 1, 2010, in Application No. 04004873.8, 2 pages.

European Oral Hearing Summons in Application 04004992.6, dated Feb. 26, 2016, 12 pgs.

European Result of Consultation dated Jul. 3, 2009, in Application No. 04004873.8, 2 pages.

European Result of Consultation dated Nov. 2, 2009, in Application No. 04004873.8, 5 pages.

European Search Report for foreign counterpart European Application No. 04004992.62224, Apr. 12, 2007, 7 pages.

European Search Report dated Jun. 11, 2004, in Application No. 04004873.8, 3 pages.

European Summons to Attend Oral Proceedings Pursuant to Rule 115(1) mailed Jun. 8, 2009, in Application No. 04004873.8, 4 pages.

*GameSpy Arcade—Play Hundreds of Online Multiplayer Games*, http://www.gamespyarcade.com/features, 1-4, visited Mar. 9, 2003.

*GameSpy Arcade—Play Hundreds of Online Multiplayer Games*, http://www.gamespyarcade.com, 1-2, visited Mar. 9, 2003.

*GameSpy Arcade—Play Hundreds of Online Multiplayer Games*, http://www.gamespyarcade.com/features/versions.shtml, 1-13, visited Mar. 9, 2003.

*GameSpy.com—Game Developers Conference 2002 Coverage*, http://www.gamespy.com/gdc2002/poweredbysteam, 1-2, visit Mar. 9, 2003.

Graham, "The Mythical Dream Interface, A Mythical Metaphoric Method for Redesigning an Interface," SIGDOC 97 Snowbird Utah, USA, 1997, pp. 79-91.

Haveliwala, "Topic-Sensitive PageRank," WWW2002, Honolulu, Hawaii, USA, 2002, pp. 517-526.

Himelstein et al., "PointCast: The Rise and Fall of an Internet Start, Its saga tells of hope and hubris in a high-risk business," Businessweek Online, www.businessweek.com/1999/99_17/b3626167.htm, 1999, 1-6.

(56) References Cited

OTHER PUBLICATIONS

*How to Install NetWare Application Launcher for Windows*, http://www.cvesd.k12.ca.us/cvesd/helpdesk/install/net_app_launcher_/pc/net_app_launch_pc.html, 1 page, visited Jan. 6, 2003.
IBM International Technical Support Centers, "OS/2 Version 2.0—Volume 2: DOS and Windows Environment," OS/2 Version 2.0, vol. 2, pp. 134-151, 179-180 and 197-204, Apr. 1992.
India Application 250/DEL/2004, First Examination Report dated Apr. 30, 2013, 2 pages.
Indian Hearing Notice in Application 250/DEL/2004, dated Jun. 6, 2016, 2 pgs.
Indian Refusal Order in Application 0250/DEL/2004, dated Oct. 31, 2016, 8 pgs.
*Instant Messaging*, en.wikipedia.ora, Dec. 19, 2006.
ISLAM, "A Flexible Security Model for Using Internet Content", SRDS '97, Oct. 1997.
*ITS—Understanding the Novell Application Launcher*, http://www.messiah.edu/addept/its/help/networ/applauncher, 1-5, visited Jan. 6, 2003.
Japanese Notice of Allowance dated Aug. 27, 2010, in Application No. 2004-050481, 6 pages.
Japanese Notice of Allowance dated Jun. 7, 2011, in Application No. 2010-180412, 6 pages.
Japanese Notice of Rejection dated May 11, 2010, in Application No. 2004-050481, 4 pages.
Japanese Official Notice of Rejection REF 2004-050481, Fumio Hirose, English Translation, dated Nov. 4, 2008, 3 pages.
Korean Notice of Allowance dated Aug. 31, 2011, in Application No. 10-2004-12913, 10 pages.
Krol, "Hypertext Spanning the Internet: WWW," The Whole Internet, O'Reily & Associates, 1992, pp. 227-242.
*Launcher UI*, http://www/adventnet.com/products/t11/help/getting_started/launcher/tcats_laun_ui.html, 2 pages, visited on Jan. 6, 2003.
Mac OS Runtime for Java, "Using Jbindery," Jun. 19, 1998, 28 pages, http://developer.apple.com/documentation/mac/pdf/Jbindery.pdf.
*Mac OS X 10.0—p. 8—(Mar. 2001)*, http://www.arstechnica.com/reviews/01q2/macos-x-final/macos-x-8.html, 1-4, visited Jan. 6, 2003.
*Menu bar and Toolbar*, http://www.adventnet.com/products/t11/help/getting_started/launcher/tcats_conf_laun.html, 2 pages, visited Jan. 6, 2003.
Microsoft Technet, "Microsoft Windows XP Professional Features," Feb. 12, 2003, 8 pages, http://teehnet.microsoft.comlen-us/library/bb457058.aspx.
Microsoft Windows Operating System, Microsoft TechNet, May 10, 2007, 8 pages.
*Real One Arcade Quick Tour*, http://www.realonearcade.com/#tour, 1-8, visited Mar. 9, 2003.
Shack e.s. *To Steam or not to Steam*, http://www.shackes.com/onearticle.x/4885/, 1-2, visited Mar. 9, 2003.
*SharePoint Fast Facts*, http://www.microsoft.com/frontpage/sharepoint.fastfacts.htm, 1-5, visited on Jan. 6, 2003.
*SharePoint Technologies Highlights*, http://www.microsoft.com/sharepoint/evaluation/overview/techhighlights.asp, 1-3, visited Jan. 6, 2003.
*SharePoint Technologies*, http://www.microsoft.com/sharepoint/evaluation/overview/technologies.asp, 1-3, visited Jan. 6, 2003.
*Steam Powered*, http://www.steampowered.com, 1-2, visited Mar. 9, 2003.
*The GNOME UI IP: UI Hit Squad: Improving The GNOME-Core Interface*, http://www.developer.gnome.org/gnome-ui/hitsquad/gnome-core.html, 1-13, visited Jan. 6, 2003.
U.S. Advisory Action dated Sep. 4, 2007, in U.S. Appl. No. 10/401,620, 3 pages.
U.S. Appl. No. 13/525,312, Notice of Allowance dated Jan. 10, 2014, 5 pages.
U.S. Appl. No. 13/525,312, Notice of Allowance dated Oct. 15, 2013, 9 pages.
U.S. Final Rejection dated Jan. 5, 2009, in U.S. Appl. No. 10/402,346, 11 pages.
U.S. Final Rejection dated Apr. 16, 2007, in U.S. Appl. No. 10/401,620, 24 pages.
U.S. Final Rejection dated Jun. 15, 2009, in U.S. Appl. No. 10/401,620, 30 pages.
U.S. Final Rejection dated Aug. 8, 2007, in U.S. Appl. No. 10/402,346, 11 pages.
U.S. Non-Final Rejection dated Feb. 6, 2008, in U.S. Appl. No. 10/402,346, 9 pages.
U.S. Non-Final Rejection dated Apr. 10, 2008, in U.S. Appl. No. 10/401,620, 29 pages.
U.S. Non-Final Rejection dated May 5, 2010, in U.S. Appl. No. 12/163,569, 8 pages.
U.S. Non-Final Rejection dated May 21, 2012, in U.S. Appl. No. 13/157,271, 5 pages.
U.S. Non-Final Rejection dated Sep. 13, 2006, in U.S. Appl. No. 10/401,620, 21 pages.
U.S. Non-Final Rejection dated Oct. 30, 2008, in U.S. Appl. No. 10/401,620, 29 pages.
U.S. Non-Final Rejection dated Nov. 15, 2007, in U.S. Appl. No. 10/401,620, 26 pages.
U.S. Non-Final Rejection dated Dec. 10, 2009, in U.S. Appl. No. 10/402,346, 10 pages.
U.S. Non-Final Rejection dated Dec. 26, 2006, in U.S. Appl. No. 10/402,346, 6 pages.
U.S. Notice of Allowance dated Feb. 19, 2013, in U.S. Appl. No. 13/157,235 (5 pages).
U.S. Notice of Allowance dated Feb. 24, 2011, in U.S. Appl. No. 12/163,569, 9 pages.
U.S. Notice of Allowance dated Feb. 26, 2013, in U.S. Appl. No. 13/157,271 (5 pages).
U.S. Notice of Allowance dated Apr. 18, 2012, in U.S. Appl. No. 13/157,235, 5 pages.
U.S. Notice of Allowance dated May 12, 2010, in U.S. Appl. No. 10/402,346, 6 pages.
U.S. Notice of Allowance dated Jun. 18, 2010, in U.S. Appl. No. 10/402,346, 4 pages.
U.S. Notice of Allowance dated Jul. 27, 2012, in U.S. Appl. No. 13/157,271, 6 pages.
U.S. Notice of Allowance dated Jul. 30, 2010, in U.S. Appl. No. 10/402,346, 4 pages.
U.S. Notice of Allowance dated Jul. 30, 2012, in U.S. Appl. No. 13/157,235, 5 pages.
U.S. Notice of Allowance dated Nov. 9, 2012, in U.S. Appl. No. 13/157,235 (5 pages).
U.S. Notice of Allowance dated Nov. 9, 2012, in U.S. Appl. No. 13/157,271 (5 pages).
U.S. Appl. No. 13/525,309, Amendment after Allowance filed Feb. 17, 2017, 7 pages.
U.S. Appl. No. 13/525,309, Amendment and Response filed Nov. 20, 2015, 12 pages.
U.S. Appl. No. 13/525,309, Amendment and Response filed Dec. 30, 2014, 10 pages.
U.S. Appl. No. 13/525,309, Amendment and Response filed Jul. 10, 2015, 9 pages.
U.S. Appl. No. 13/525,309, Amendment and Response filed Jul. 29, 2016, 11 pages.
U.S. Appl. No. 13/525,309, Notice of Allowance dated Nov. 18, 2016, 5 pages.
U.S. Appl. No. 13/525,309, Notice of Allowance dated Aug. 22, 2016, 5 pages.
U.S. Appl. No. 13/525,309, Office Action dated Feb. 10, 2015, 6 pages.
U.S. Appl. No. 13/525,309, Office Action dated Feb. 2, 2016, 7 pages.
U.S. Appl. No. 13/525,309, Office Action dated Jul. 1, 2014, 7 pages.
U.S. Appl. No. 13/525,309, Office Action dated Jul. 22, 2015, 7 pages.
U.S. Appl. No. 13/525,309, USPTO Response dated Feb. 28, 2017, 2 pages.
U.S. Response filed Jan. 6, 2011, in U.S. Appl. No. 12/163,569, 20 pages.

(56) References Cited

OTHER PUBLICATIONS

U.S. Response filed Jan. 8, 2008, in U.S. Appl. No. 10/402,346, 13 pages.
U.S. Response filed Jan. 23, 2007, in U.S. Appl. No. 10/401,620, 23 pages.
U.S. Response filed Feb. 5, 2010, in U.S. Appl. No. 10/402,346, 10 pages.
U.S. Response filed Feb. 15, 2008, in U.S. Appl. No. 10/401,620, 22 pages.
U.S. Response filed Mar. 2, 2009, in U.S. Appl. No. 10/401,620, 23 pages.
U.S. Response filed May 5, 2009, in U.S. Appl. No. 10/402,346, 22 pages.
U.S. Response filed Jun. 3, 2010, in U.S. Appl. No. 10/402,346, 9 pages.
U.S. Response filed Jul. 23, 2010, in U.S. Appl. No. 10/402,346, 9 pages.
U.S. Response filed Jul. 29, 2010, in U.S. Appl. No. 12/163,569, 18 pages.
U.S. Response filed Aug. 6, 2008, in U.S. Appl. No. 10/402,346, 16 pages.
U.S. Response filed Aug. 16, 2007, in U.S. Appl. No. 10/401,620, 23 pages.
U.S. Response filed Oct. 10, 2008, in U.S. Appl. No. 10/401,620, 21 pages.
U.S. Response dated May 29, 2007, in U.S. Appl. No. 10/402,346, 13 pages.
U.S. Response dated Jul. 10, 2012, in U.S. Appl. No. 13/157,271, 11 pages.
*Use the PointCast Business $^{Network\text{TM}}$ to Get Wired News*, Wired News, www.wired.com/news/pointcast.html, 1-2, visited Mar. 27, 2003.
*Using Novel's Application Launcher to Install Packages*, http://www.lanovation.com/support/docs/3rd_Party.NAL.htm, 1-6 visited Jan. 6, 2003.
*Valve ERC*, http://www.valve-erc.com/content/?page=utilities, 1-4, visited Mar. 9, 2003.
*Valve Software (English version) Interview/Articles/Computer Games Online*, http://www.computergames.ro/articole.php?=optiune=show_interview=83, 1-5, visited Mar. 9, 2006.
"Non Final Office Action Issued in U.S. Appl. No. 12/750,602", dated Dec. 21, 2011, 5 Pages.
"Notice of Allowance Issued in U.S. Appl. No. 12/750,602", dated Mar. 14, 2012, 6 Pages.
"Notice of Allowance Issued in U.S. Appl. No. 12/750,602", dated Jun. 25, 2012, 5 Pages.

* cited by examiner

FIG. 20

```
NAMESPACE MICROSOFT.MYGAMES.GAMEDESCRIPTION
{
    /// <SUMMARY>
    /// INSTALLTYPES IS AN ENUM DESCRIBING THE DIFFERENT INSTALL TYPES FOR GDF FILES.
    /// </SUMMARY>
    PUBLIC ENUM INSTALLTYPES
    {
        /// <SUMMARY>
        /// SUPPORTED TITLE
        /// </SUMMARY>
        SUPPORTED = 0,
        /// <SUMMARY>
        /// LEGACY TITLE
        /// </SUMMARY>
        LEGACY = 2,
        /// <SUMMARY>
        /// WEB TITLE
        /// </SUMMARY>
        WEB = 3
    }
```

```
/// <SUMMARY>
/// SUMMARY DESCRIPTION FOR GAMEDESCRIPTIONFILEINSTALLER.
/// </SUMMARY>
PUBLIC CLASS GAMEDESCRIPTIONFILEINSTALLER : MARSHALBYREFOBJECT,IDISPOSABLE
{
    /// <SUMMARY>
    /// STANDARD CONSTRUCTOR
    /// </SUMMARY>
        PUBLIC GAMEDESCRIPTIONFILEINSTALLER() {}

/// <SUMMARY>
    /// USED TO ENSURE DIRECTORIES ARE PROPERLY CREATED ETC...
    /// MUST BE CALLED BEFORE ANY OTHER API'S
    /// </SUMMARY>
        PUBLIC VOID INITIALIZE() {}

/// <SUMMARY>
    /// CALLED WHEN FINISHED USING THE INSTALLER
    /// </SUMMARY>
        PUBLIC VOID DISPOSE() {}

/// <SUMMARY>
    /// DESTRUCTOR FOR GAMEDESCRIPTIONFILEINSTALLER
    /// </SUMMARY>
        ~GAMEDESCRIPTIONFILEINSTALLER() {}
```

```
/// <SUMMARY>
/// THE FUNCTION FOR ENTERING A LEGACY TITLE INTO MYGAMES
/// </SUMMARY>
/// <PARAM NAME="APPID">THE APPID OF THE TITLE WE ARE ADDING</PARAM>
/// <PARAM NAME="EXEPATHNAME">THE FULLY QUALIFIED PATH TO THE PATH+NAMEOF EXE</PARAM>
       PUBLIC VOID ADDLEGACYTITLE(GUID APPID, STRING EXEPATHNAME) {}

/// <SUMMARY>
/// THE FUNCTION FOR ENTERING A WEB TITLE INTO MYGAMES
/// </SUMMARY>
/// <PARAM NAME="APPID">THE APPID OF THE WEB TITLE WE ARE ADDING</PARAM>
       PUBLIC VOID ADDWEBTITLE(GUID APPID) {}

/// <SUMMARY>
/// THIS METHOD IS CALLED AS PART OF A GAME'S SETUP PROGRAM TO INSTALL THE GDF FILE FOR THIS GAME. THE
/// GAME WILL NOT APPEAR IN THE GAME LIBRARY FOLDER UNTIL THIS METHOD IS CALLED
/// </SUMMARY>
/// <PARAM NAME="FILEPATH">THE ABSOLUTE PATH TO THE GDF FILE FOR THE GAME</PARAM>
/// <PARAM NAME="ALLUSERS">TRUE IF THE GAME IS INSTALLED FOR ALL USERS, FALSEOTHERWISE</PARAM>
       PUBLIC VOID ADDSUPPORTEDTITLE (STRING FILEPATH, BOOL ALLUSERS) {}

/// <SUMMARY>
/// RETURNS AN ARRAY OF APPID'S FOR THE APPS THAT WILL SHOW UP IN MY GAMES
/// </SUMMARY>
/// <RETURNS>STRING ARRAY OF THE APPID'S</RETURNS>
       PUBLIC GUID[] GETMYGAMESAPPS() {}
```

FIG. 23

```
/// <SUMMARY>
/// GET THE SUPPORTED GAMES INSTALLED ON THE SYSTEM
/// </SUMMARY>
/// <RETURNS>AN ARRAY OF GUIDS</RETURNS>
    PUBLIC GUID[] GETMYGAMESSUPPORTEDAPPS() {}

/// <SUMMARY>
/// RETURNS AN ARRAY OF APPIDS FOR THE GAMES THAT AREINSTALLED IN LEGACY MODE
/// </SUMMARY>
/// <RETURNS>ARRAY OF APPIDS CORRESPONDING TO THE LEGACY TITLES<RETURNS>
    PUBLIC GUID[] GETMYGAMESLEGACYAPPS() {}

/// <SUMMARY>
/// RETURNS AN ARRAY OF APPIDS FOR THE GAMES THAT ARE NSTALLED IN WEB MODE
/// </SUMMARY>
/// <RETURNS>ARRAY OF APPIDS CORRESPONDING TO THE LEGACY TITLES<RETURNS>
    PUBLIC GUID[] GETMYGAMESWEBAPPS() {}
```

```
/// <SUMMARY>
/// CALLED TO DETERMINE IF THE SPECIFIED APP IS INSTALLED ON THE SYSTEM
/// </SUMMARY>
/// <PARAM NAME="APPID">APPID TO CHECK</PARAM>
/// <PARAM NAME="INSTALLTYPE">THE TYPE OF INSTALL TO CHECK FOR</PARAM>
/// <RETURNS>BOOLEAN, TRUE IF APP IS INSTALLED, FALSE OTHERWISE</RETURNS>
PUBLIC BOOL ISAPPINSTALLED( GUID APPID, INSTALLTYPES INSTALLTYPE ) {}
```

```
/// <SUMMARY>
/// THIS METHOD RETURNS TRUE IF THE GAME CORRESPONDING TO THE INPUT APPID IS INSTALLED IN ANY MODE --
/// SUPPORTED, LEGACY, WEB
/// </SUMMARY>
/// <PARAM NAME="APPID">THE GUID REPRESENTING THE GAME</PARAM>
/// <RETURNS>TRUE IF THE APP IS INSTALLED, FALSE OTHERWISE</RETURNS>
    PUBLIC BOOL ISAPPINSTALLED( GUID APPID ) {}

/// <SUMMARY>
/// CALLED TO DETERMINE IF THIS GIVEN LEGACY APP HAS BEEN INSTALLED TO THE GIVEN LOCATION FOR THIS USER.
/// </SUMMARY>
/// <PARAM NAME="APPID">ID OF THE TITLE TO CHECK FOR</PARAM>
/// <PARAM NAME="EXEPATHNAME">THE FULL PATH AND EXE NAME WE ARE CHECKING AGAINST</PARAM>
/// <RETURNS>BOOL REPRESENTING IF THE GIVEN APPID EXEPATHNAME PAIR REPRESENTS A CURRENTLY INSTALLED LEGACY TITLE</RETURNS>
    PUBLIC BOOL ISLEGACYTITLEINSTALLED(GUID APPID, STRING EXEPATHNAME) {}
```

```
/// <SUMMARY>
/// CALLED TO DETERMINE IF THIS GIVEN WEB APP HAS BEEN INSTALLED TO THE GIVEN LOCATION FOR THIS USER
/// </SUMMARY>
/// <PARAM NAME="APPID">ID OF THE TITLE TO CHECK FOR</PARAM>
/// <RETURNS>BOOL REPRESENTING IF THE GIVEN APPID REPRESENTS A CURRENTLY INSTALLED LEGACY TITLE</RETURNS>
    PUBLIC BOOL ISWEBTITLEINSTALLED(GUID APPID) {}

/// <SUMMARY>
/// CALLED TO REMOVE A WEB TITLE FROM MYGAMES
/// </SUMMARY>
/// <PARAM NAME="APPID">ID OF THE TITLE TO UNINSTALL</PARAM>
    PUBLIC VOID UNINSTALLWEBTITLE(GUID APPID) {}

/// <SUMMARY>
/// CALLED TO REMOVE A SUPPORTED TITLE FROM MYGAMES
/// </SUMMARY>
/// <PARAM NAME="APPID">ID OF THE TITLE TO UNINSTALL</PARAM>
    PUBLIC VOID UNINSTALLSUPPORTEDTITLE(GUID APPID) {}

/// <SUMMARY>
/// CALLED TO REMOVE A LEGACY TITLE FROM MYGAMES
/// </SUMMARY>
/// <PARAM NAME="APPID">ID OF THE TITLE TO UNINSTALL</PARAM>
    PUBLIC VOID UNINSTALLLEGACYTITLE(GUID APPID, STRING EXEPATHNAME ) {}
}
```

FIG. 27

```
<?XML VERSION="1.0" ENCODING="UTF-16"?>
<XS:SCHEMA
    TARGETNAMESPACE="URN:SCHEMA.SETUP.MICROSOFT.WINDOWS.COM/ADF"
    XMLNS="URN:SCHEMA.SETUP.MICROSOFT.WINDOWS.COM/ADF"
    XMLNS:XS="HTTP://WWW.W3.ORG/2001/XMLSCHEMA"
    ELEMENTFORMDEFAULT="QUALIFIED"
>
<!-- ROOT ELEMENT -->
<!-- <XS:ELEMENT NAME="ADF" TYPE="ADFTYPE"/> -->
<XS:COMPLEXTYPE NAME="TASKDATA">
    <XS:SEQUENCE>
        <XS:ELEMENT NAME="DESCRIPTION" TYPE="XS:STRING"/>
        <XS:ELEMENT NAME="INVOKEDATA" TYPE="XS:STRING"/>
        <XS:ELEMENT NAME="WORKINGPATH" TYPE="XS:STRING" MINOCCURS="0"
MAXOCCURS="1"/>
        <XS:ELEMENT NAME="ARGUMENTS" TYPE="XS:STRING" MINOCCURS="0"
MAXOCCURS="1"/>
    </XS:SEQUENCE>
</XS:COMPLEXTYPE>
<XS:COMPLEXTYPE NAME="RESOURCELINK">
    <XS:SEQUENCE>
        <XS:ELEMENT NAME="FILENAME" TYPE="XS:STRING"/>
        <XS:ELEMENT NAME="RESOURCEID" TYPE="XS:INT" MINOCCURS="0" MAXOCCURS="1"/>
        <XS:ELEMENT NAME="RESOURCETYPE" TYPE="XS:INT" MINOCCURS="0"
MAXOCCURS="1"/>
    </XS:SEQUENCE>
</XS:COMPLEXTYPE>
```

<XS:SIMPLETYPE NAME="VERSION">
    <XS:RESTRICTION BASE="XS:STRING">
        <XS:PATTERN VALUE="[0-9*]+\.[0-9*]+\.[0-9*]+\.[0-9*]+"/>
    </XS:RESTRICTION>
</XS:SIMPLETYPE>
<XS:SIMPLETYPE NAME="EXACTVERSION">
    <XS:RESTRICTION BASE="XS:STRING">
        <XS:PATTERN VALUE="[0-9]+\.[0-9]+\.[0-9]+\.[0-9]+"/>
    </XS:RESTRICTION>
</XS:SIMPLETYPE>
<XS:SIMPLETYPE NAME="GUID">
    <XS:RESTRICTION BASE="XS:STRING">
        <XS:PATTERN VALUE="\{[0-9A-FA-F]{8}\-[0-9A-FA-F]{4}\-[0-9A-FA-F]{4}\-[0-9A-FA-F]{4}\-[0-9A-FA-F]{12}\}"/>
    </XS:RESTRICTION>
</XS:SIMPLETYPE>
<XS:COMPLEXTYPE NAME="ADFTYPE">
    <XS:SEQUENCE>
        <XS:ELEMENT NAME="IDENTITY">
            <XS:COMPLEXTYPE>
                <XS:SEQUENCE>
                    <XS:ELEMENT NAME="APPLICATIONID" TYPE="GUID"/>
                    <XS:ELEMENT NAME="VERSIONRANGE" TYPE="VERSION" MINOCCURS="0" MAXOCCURS="1"/>
                    <XS:ELEMENT NAME="METADATAVERSION" TYPE="EXACTVERSION">
```

<XS:ANNOTATION>
    <XS:DOCUMENTATION>ASSEMBLYIDENTITY. VERSION MAY
CARRY THIS INFORMATION. PROVIDED FOR COMPATIBILITY. MAY BE REMOVED</XS:DOCUMENTATION>
</XS:ANNOTATION>
<XS:ELEMENT NAME="SCHEMAVERSION" TYPE="EXACTVERSION"/>
<XS:ELEMENT NAME="PRODUCTFAMILYID" TYPE="GUID"
MINOCCURS="0">
    <XS:ANNOTATION>
        <XS:DOCUMENTATION>CATEGORIES. SUITE SUPPORT
</XS:DOCUMENTATION>
    </XS:ANNOTATION>
</XS:ELEMENT>
<XS:ELEMENT NAME="PARENTAPPLICATIONID" TYPE="GUID"
MINOCCURS="0">
    <XS:ANNOTATION>
        <XS:DOCUMENTATION>"PLUG-IN"-STYLE APPS
</XS:DOCUMENTATION>
    </XS:ANNOTATION>
</XS:ELEMENT>
</XS:SEQUENCE>
</XS:COMPLEXTYPE>
</XS:ELEMENT>
```

FIG. 30

```
<XS:ELEMENT NAME="COMMONTASKDATA">
    <XS:COMPLEXTYPE>
        <XS:SEQUENCE>
            <XS:ELEMENT NAME="RUNAPPLICATION" TYPE="TASKDATA"/>
            <XS:ELEMENT NAME="HOMEPAGE" TYPE="TASKDATA" MINOCCURS="0" MAXOCCURS="1"/>
            <XS:ELEMENT NAME="RUNHELP" TYPE="TASKDATA" MINOCCURS="0" MAXOCCURS="1"/>
            <XS:ELEMENT NAME="GETSUPPORT" TYPE="TASKDATA" MINOCCURS="0" MAXOCCURS="1"/>
            <XS:ELEMENT NAME="FORUMS" TYPE="TASKDATA" MINOCCURS="0" MAXOCCURS="1"/>
            <XS:ELEMENT NAME="NEWSGROUP" TYPE="TASKDATA" MINOCCURS="0" MAXOCCURS="1"/>
            <XS:ELEMENT NAME="README" TYPE="TASKDATA" MINOCCURS="0" MAXOCCURS="1"/>
            <XS:ELEMENT NAME="LICENSE" TYPE="TASKDATA" MINOCCURS="0" MAXOCCURS="1"/>
            <XS:ELEMENT NAME="DOWNLOADDEMO" TYPE="TASKDATA" MINOCCURS="0" MAXOCCURS="1"/>
            <XS:ELEMENT NAME="PURCHASE" TYPE="TASKDATA" MINOCCURS="0" MAXOCCURS="1"/>
            <XS:ELEMENT NAME="UNINSTALL" TYPE="TASKDATA" MINOCCURS="0" MAXOCCURS="1"/>
            <XS:ELEMENT NAME="CUSTOM" TYPE="TASKDATA" MINOCCURS="0" MAXOCCURS="10"/>
        </XS:SEQUENCE>
    </XS:COMPLEXTYPE>
</XS:ELEMENT>
```

2700

```
<XS:ELEMENT NAME="EXTENSIONDATA">
  <XS:COMPLEXTYPE>
    <XS:SEQUENCE>
      <XS:ANY NAMESPACE="##ANY" PROCESSCONTENTS="LAX" MINOCCURS="0" MAXOCCURS="UNBOUNDED" />
    </XS:SEQUENCE>
  </XS:COMPLEXTYPE>
</XS:ELEMENT>
<XS:ELEMENT NAME="BOXART" TYPE="RESOURCELINK" MINOCCURS="0"/>
<XS:ELEMENT NAME="LOGO" TYPE="RESOURCELINK" MINOCCURS="0"/>
<XS:ELEMENT NAME="ICON" TYPE="RESOURCELINK" MINOCCURS="0"/>
    </XS:SEQUENCE>
  </XS:COMPLEXTYPE>
</XS:SCHEMA>
```

FIG. 32

```
<?XML VERSION="1.0" ENCODING="UTF-16"?>
<XS:SCHEMA
   TARGETNAMESPACE="URN:SCHEMA.SETUP.MICROSOFT.WINDOWS.COM/ADF/GAMING"
   XMLNS:XS="HTTP://WWW.W3.ORG/2001/XMLSCHEMA"
   XMLNS="URN:SCHEMA.SETUP.MICROSOFT.WINDOWS.COM/ADF/GAMING"
   ELEMENTFORMDEFAULT="QUALIFIED"
>
<!--   <XS:ELEMENT NAME="GDFEXTENSIONS" TYPE="GDFEXTENSIONSTYPE"/> -->
   <XS:SIMPLETYPE NAME="GUID">
      <XS:RESTRICTION BASE="XS:STRING">
         <XS:PATTERN VALUE="\{[0-9A-FA-F]{8}\-[0-9A-FA-F]{4}\-[0-9A-FA-F]{4}\-[0-9A-FA-F]{4}\-[0-9A-FA-F]{12}\}"/>
      </XS:RESTRICTION>
   </XS:SIMPLETYPE>
   <XS:COMPLEXTYPE NAME="RATING">
      <XS:SEQUENCE>
         <XS:ELEMENT NAME="RATINGSYSTEM" TYPE="GUID" MINOCCURS="1" MAXOCCURS="1"/>
         <XS:ELEMENT NAME="RATING" TYPE="XS:STRING" MINOCCURS="1" MAXOCCURS="1"/>
         <XS:ELEMENT NAME="DESCRIPTORS" TYPE="XS:STRING" MINOCCURS="0" MAXOCCURS="1"/>
      </XS:SEQUENCE>
   </XS:COMPLEXTYPE>
```

```
<XS:SIMPLETYPE NAME="FLAG">
    <XS:RESTRICTION BASE="XS:STRING">
        <XS:MAXLENGTH VALUE="0"/>
    </XS:RESTRICTION>
</XS:SIMPLETYPE>
<XS:SIMPLETYPE NAME="EXACTVERSION">
    <XS:RESTRICTION BASE="XS:STRING">
        <XS:PATTERN VALUE="[0-9]+\.[0-9]+\.[0-9]+"/>
    </XS:RESTRICTION>
</XS:SIMPLETYPE>
<XS:COMPLEXTYPE NAME="GDFEXTENSIONSTYPE">
    <XS:SEQUENCE>
        <XS:ELEMENT NAME="GAMEDESCRIPTION">
            <XS:COMPLEXTYPE>
                <XS:SEQUENCE>
                    <XS:ELEMENT NAME="GAMEGENRES" MAXOCCURS="1">
                        <XS:COMPLEXTYPE>
                            <XS:SEQUENCE>
                                <XS:ELEMENT NAME="GENRE" TYPE="XS:STRING" MAXOCCURS="3"/>
                            </XS:SEQUENCE>
                        </XS:COMPLEXTYPE>
                    </XS:ELEMENT>
```

```
<XS:ELEMENT NAME="RATINGS" MINOCCURS="0" MAXOCCURS="1">
    <XS:COMPLEXTYPE>
        <XS:SEQUENCE>
            <XS:ELEMENT NAME="RATING" TYPE="RATING"/>
        </XS:SEQUENCE>
    </XS:COMPLEXTYPE>
</XS:ELEMENT>
<XS:ELEMENT NAME="SCHEMAVERSION" TYPE="EXACTVERSION" MINOCCURS="1" MAXOCCURS="1"/>
        </XS:SEQUENCE>
    </XS:COMPLEXTYPE>
</XS:ELEMENT>
<XS:ELEMENT NAME="SAVEGAME" MINOCCURS="0">
    <XS:COMPLEXTYPE>
        <XS:SEQUENCE>
            <XS:ELEMENT NAME="SUPPORTSMETADATA" TYPE="FLAG" MINOCCURS="0"/>
            <XS:ELEMENT NAME="LAUNCHSAVEGAME" TYPE="FLAG" MINOCCURS="0"/>
            <XS:ELEMENT NAME="SAVEGAMEEXTENSION" TYPE="XS:STRING" MINOCCURS="0"/>
            <XS:ELEMENT NAME="QUICKSAVEGAMEEXTENSION" TYPE="XS:STRING" MINOCCURS="0"/>
            <XS:ELEMENT NAME="SAVEGAMEDIR" TYPE="XS:ANYURI" MINOCCURS="0"/>
        </XS:SEQUENCE>
    </XS:COMPLEXTYPE>
</XS:ELEMENT>
```

<XS:ELEMENT NAME="MULTIPLAYER" MINOCCURS="0">
  <XS:COMPLEXTYPE>
    <XS:SEQUENCE>
      <XS:ELEMENT NAME="PLAYERRANGE" TYPE="XS:STRING"/>
      <XS:ELEMENT NAME="DIRECTPLAYLOBBY8GUID" TYPE="GUID" MINOCCURS="0" MAXOCCURS="1" />
      <XS:ELEMENT NAME="DIRECTPLAYLOBBY4GUID" TYPE="GUID" MINOCCURS="0" MAXOCCURS="1" />
    </XS:SEQUENCE>
  </XS:COMPLEXTYPE>
</XS:ELEMENT>
<XS:ELEMENT NAME="INFOLINKS" MINOCCURS="0" MAXOCCURS="1">
  <XS:COMPLEXTYPE>
    <XS:SEQUENCE>
      <XS:ELEMENT NAME="SOURCEURL" TYPE="XS:ANYURI" MINOCCURS="1" MAXOCCURS="1"/>
    </XS:SEQUENCE>
  </XS:COMPLEXTYPE>
</XS:ELEMENT>
<XS:ELEMENT NAME="GDFEXTENSIONS" TYPE="GDFEXTENSIONSTYPE"/>
</XS:SCHEMA>
```

FIG. 36

```
<?XML VERSION='1.0' ENCODING='UTF-16'?>
<ASSEMBLY MANIFESTVERSION="1.0" XMLNS="URN:SCHEMA.SETUP.MICROSOFT.WINDOWS.COM"
XMLNS:BASE="URN:SCHEMA.SETUP.MICROSOFT.WINDOWS.COM">
<ASSEMBLYIDENTITY VERSION="1.0.0.0" PROCESSORARCHITECTURE="X86"
NAME="MICROSOFT.MYGAMES.GDF.LEGACY.FREECELL" TYPE="WIN32" LANGUAGE="EN" />
<DESCRIPTION>
    <FULLNAME>MICROSOFT® FREECELL</FULLNAME>
    <DISPLAYNAME>FREECELL</DISPLAYNAME>
    <SUMMARY>A FUN CARD GAME INCLUDED WITH WINDOWS.</SUMMARY>
    <DESCRIPTION>THE OBJECT OF FREECELL IS TO MOVE ALL THE CARDS TO THE HOME CELLS, USING
THE FREE CELLS AS PLACEHOLDERS. TO WIN, MAKE FOUR STACKS OF CARDS ON THE HOME CELLS, ONE
FOR EACH SUIT, STACKED IN ORDER OF RANK, FROM LOWEST (ACE) TO HIGHEST (KING).</DESCRIPTION>
    <PUBLISHERS>
        <PUBLISHER>
            <NAME>MICROSOFT CORPORATION</NAME>
            <URL>HTTP://WWW.MICROSOFT.COM</URL>
        </PUBLISHER>
    </PUBLISHERS>
    <RELEASEDATE>2000-01-01</RELEASEDATE>
    <DEVELOPERS>
        <DEVELOPER>
            <NAME>MICROSOFT CORPORATION</NAME>
            <URL>HTTP://WWW.MICROSOFT.COM</URL>
        </DEVELOPER>
    </DEVELOPERS>
```

```xml
<APPLICATIONGENRES>
    <GENRE>GAME</GENRE>
</APPLICATIONGENRES>
</DESCRIPTION>
<BASE:ADF XMLNS="URN:SCHEMA.SETUP.MICROSOFT.WINDOWS.COM/ADF">
    <IDENTITY>
        <APPLICATIONID>{A8977498-2FDF-42B7-A726-8D3B2A53CD2C}</APPLICATIONID>
        <VERSIONRANGE>1.0.*.*</VERSIONRANGE>
        <METADATAVERSION>0.9.0.0000</METADATAVERSION>
        <SCHEMAVERSION>0.0.0.7</SCHEMAVERSION>
    </IDENTITY>
    <COMMONTASKDATA>
        <RUNAPPLICATION>
            <DESCRIPTION>PLAY FREECELL</DESCRIPTION>
            <INVOKEDATA>|APPDIR|\FREECELL.EXE</INVOKEDATA>
            <WORKINGPATH>|APPDIR|</WORKINGPATH>
        </RUNAPPLICATION>
        <HOMEPAGE>
            <DESCRIPTION>HOME PAGE</DESCRIPTION>
            <INVOKEDATA>HTTP://WWW.MICROSOFT.COM/</INVOKEDATA>
        </HOMEPAGE>
        <RUNHELP>
            <DESCRIPTION>HELP</DESCRIPTION>
            <INVOKEDATA>|WINDOWS|\HELP\FREECELL.CHM</INVOKEDATA>
            <WORKINGPATH>|WINDOWS|</WORKINGPATH>
        </RUNHELP>
```

FIG. 38

```
<GETSUPPORT>
    <DESCRIPTION>SUPPORT</DESCRIPTION>
    <INVOKEDATA>HTTP://WWW.MICROSOFT.COM/SUPPORT</INVOKEDATA>
</GETSUPPORT>
</COMMONTASKDATA>
<EXTENSIONDATA>
<GDFEXTENSIONS XMLNS="URN:SCHEMA.SETUP.MICROSOFT.WINDOWS.COM/ADF/GAMING">
    <GAMEDESCRIPTION>
        <GAMEGENRES>
            <GENRE>CARDS, QUIZ AND BOARDGAMES</GENRE>
        </GAMEGENRES>
        <SCHEMAVERSION>0.0.0.7</SCHEMAVERSION>
    </GAMEDESCRIPTION>
</GDFEXTENSIONS>
</EXTENSIONDATA>
<BOXART>
    <FILENAME>FREECELL.PNG</FILENAME>
</BOXART>
<ICON>
    <FILENAME>FREECELL.ICO</FILENAME>
</ICON>
</BASE:ADF>
</ASSEMBLY>
```

```
<?XML VERSION="1.0" ENCODING="UTF-16"?>
<XSD:SCHEMA TARGETNAMESPACE="URN:SCHEMA.SETUP.MICROSOFT.WINDOWS.COM"
XMLNS:XSD="HTTP://WWW.W3.ORG/2001/XMLSCHEMA"
XMLNS="URN:SCHEMA.SETUP.MICROSOFT.WINDOWS.COM"
XMLNS:ADF="URN:SCHEMA.SETUP.MICROSOFT.WINDOWS.COM/ADF"
ELEMENTFORMDEFAULT="QUALIFIED" ATTRIBUTEFORMDEFAULT="UNQUALIFIED">
    <XSD:IMPORT NAMESPACE="URN:SCHEMA.SETUP.MICROSOFT.WINDOWS.COM/ADF"/>
    ..
    // ADDITIONAL INFORMATION CAN BE INCLUDED HERE
    ..
    <XSD:COMPLEXTYPE NAME="ASSEMBLYTYPE">
        <XSD:SEQUENCE>
            ..
            // ADDITIONAL INFORMATION CAN BE INCLUDED HERE
            ..
            <XSD:ELEMENT NAME="DESCRIPTION" MINOCCURS="0">
                <XSD:COMPLEXTYPE>
                    <XSD:SEQUENCE>
                        <XSD:ELEMENT NAME="FULLNAME" TYPE="XSD:STRING" MINOCCURS="0"/>
                        <XSD:ELEMENT NAME="DISPLAYNAME" TYPE="XSD:STRING" MINOCCURS="1"/>
                        <XSD:ELEMENT NAME="SUMMARY" TYPE="XSD:STRING" MINOCCURS="0"/>
                        <XSD:ELEMENT NAME="DESCRIPTION" TYPE="XSD:STRING" MINOCCURS="0"/>
                        <XSD:ELEMENT NAME="PUBLISHERS" MINOCCURS="0">
```

```
                    <XSD:COMPLEXTYPE>
                      <XSD:SEQUENCE>
                        <XSD:ELEMENT NAME="PUBLISHER" TYPE="COMPANYINFO" MAXOCCURS="3"/>
                      </XSD:SEQUENCE>
                    </XSD:COMPLEXTYPE>
                  </XSD:ELEMENT>
                  <XSD:ELEMENT NAME="RELEASEDATE" TYPE="XSD:STRING" MINOCCURS="0"/>
                  <XSD:ELEMENT NAME="DEVELOPERS" MINOCCURS="0">
                    <XSD:COMPLEXTYPE>
                      <XSD:SEQUENCE>
                        <XSD:ELEMENT NAME="DEVELOPER" TYPE="COMPANYINFO" MAXOCCURS="3"/>
                      </XSD:SEQUENCE>
                    </XSD:COMPLEXTYPE>
                  </XSD:ELEMENT>
                  <XSD:ELEMENT NAME="APPLICATIONGENRES" MINOCCURS="0">
                    <XSD:COMPLEXTYPE>
                      <XSD:SEQUENCE>
                        <XSD:ELEMENT NAME="GENRE" TYPE="APPGENRE" MINOCCURS="1" MAXOCCURS="3"/>
                      </XSD:SEQUENCE>
                    </XSD:COMPLEXTYPE>
                  </XSD:ELEMENT>
```

<XSD:ELEMENT NAME="ADF" TYPE="ADF:ADFTYPE" MINOCCURS="0"/>
      </XSD:SEQUENCE>
      <XSD:ATTRIBUTEGROUP REF="COMMONATTRIBUTESGROUP"/>
    </XSD:COMPLEXTYPE>
    <XSD:SIMPLETYPE NAME="APPGENRE">
      <XSD:RESTRICTION BASE="XSD:STRING">
        <XSD:ENUMERATION VALUE="GAME" />
      </XSD:RESTRICTION>
    </XSD:SIMPLETYPE>
    <XSD:COMPLEXTYPE NAME="COMPANYINFO">
      <XSD:SEQUENCE>
        <XSD:ELEMENT NAME="NAME" TYPE="XSD:STRING"/>
        <XSD:ELEMENT NAME="URL" TYPE="XSD:ANYURI" MINOCCURS="0"/>
      </XSD:SEQUENCE>
    </XSD:COMPLEXTYPE>
    <XSD:ELEMENT NAME="ASSEMBLY" TYPE="ASSEMBLYTYPE"/>
</XSD:SCHEMA>
```

APPLICATION-CENTRIC USER INTERFACE TECHNIQUES

CROSS-REFERENCE TO RELATED APPLICATIONS

This application is a continuation of and claims benefit from U.S. patent application Ser. No. 13/525,309, now U.S. Pat. No. 9,610,498, filed Jun. 16, 2012, which is a continuation of and claims benefit from U.S. patent application Ser. No. 12/750,602, now U.S. Pat. No. 8,245,534, filed Mar. 30, 2010, that is a continuation of and claims benefit from U.S. Pat. No. 7,846,023, filed Mar. 27, 2003, each of which is incorporated herein in its entirety.

TECHNICAL FIELD

The technical field relates to human-computer interaction, such as when a computer user interacts with user interfaces presented by software.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Since the beginning of the computer age, various techniques of human-computer interaction have been developed and implemented to help make computers easier to use. For example, the now common graphical user interface ("GUI") paradigm has made selecting programs easier because a user can point to an icon related to a desired program, rather than having to type in the program's name.

However, with the advent of ever more complex computing machinery has come seemingly more complex graphical user interfaces offering many levels of choices. A user can be presented with so many levels of choices in a user interface that finding the desired option becomes an unwelcome chore. As a result, a user may tend to avoid choices that may in fact be desirable. The large number of choices thus serves as a barrier for the user.

SUMMARY

The described technologies can provide various user interface arrangements and related functionality. For example, various application-centric user interface techniques can be employed.

In some examples, an application-centric user interface is presented to a user. In some examples, a user can add, update, or launch programs from the application-centric portion.

In some examples, the application-centric user interface includes an activity center by which a user can perform various actions related to the applications.

In a described implementation, the applications include game-related software. For example, a user can be presented with the available games and related information. In some examples, multiplayer online games can be launched.

Additional features and advantages will be made apparent from the following detailed description of illustrated embodiments, which proceeds with reference to the accompanying drawings.

BRIEF DESCRIPTION OF THE DRAWINGS

FIGS. 20-26 are a programming language excerpt specifying an exemplary application programming interface for achieving application installation via the technologies described herein.

FIGS. 27-31 specify an exemplary XML schema for use with application metadata.

FIGS. 32-35 specify an exemplary XML schema for use with application metadata with specialized game-related metadata.

FIGS. 36-38 specify exemplary metadata for a game application according to the schema of FIGS. 32-35.

FIGS. 39-41 specify an exemplary XML schema for use with an application manifest.

DETAILED DESCRIPTION

Example 1—Exemplary System Overview

Various of the examples described herein can make use of application-centric user interface techniques. With the advent of ever-more complex user interfaces, application-centric user interface techniques can avoid the frustration associated with being unable to easily find applications and perform tasks for the applications. For example, application-centric user interface techniques can treat applications in a special way and include an area of the user interface limited to applications (e.g., other types of items, such as files, are not listed in the area). Such an approach can be an improvement over a system that merely presents applications as part of a file system that includes a myriad of other items, such as files.

In addition, various of the techniques described herein can lead to a more rich presentation of applications, such as when presented by an operating system shell. In this way, an application publisher can customize their application's shell presentation. The techniques can accommodate a variety of applications from different application publishers.

Example 2—Exemplary User Interface Presentations

Figure 1A:
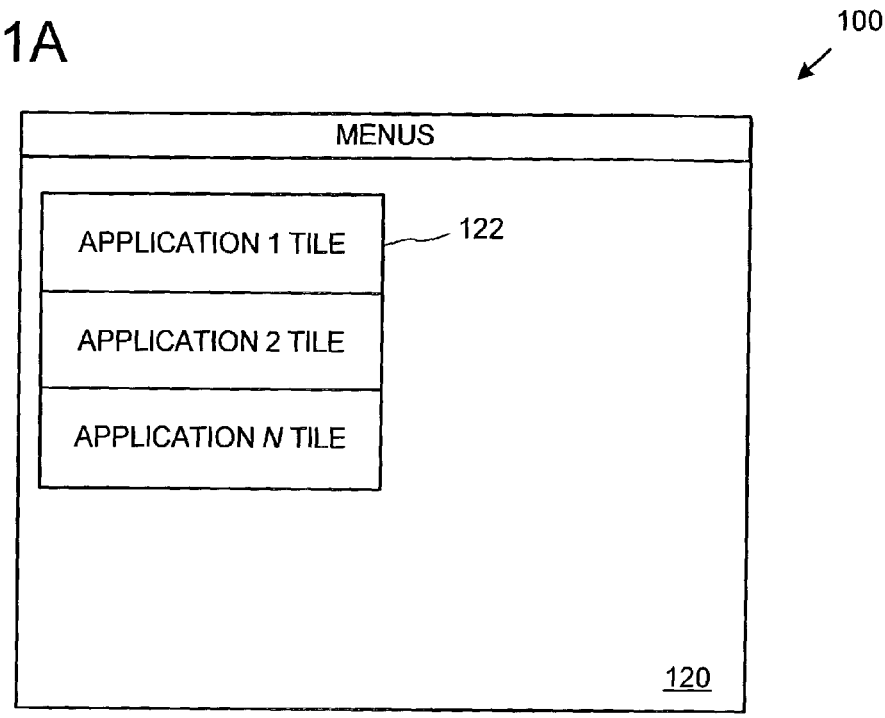
FIGS. 1A and 1B are screen shots of exemplary application-centric user interfaces.

FIG. 1A shows a screen shot of an exemplary application-centric user interface 100. In the example, there are two or more application tiles 122 which display representations of respective applications in a pane 120. Items displayed in the pane 120 can be limited to representations of applications (e.g., representations of other items or files do not appear).

Figure 1B:
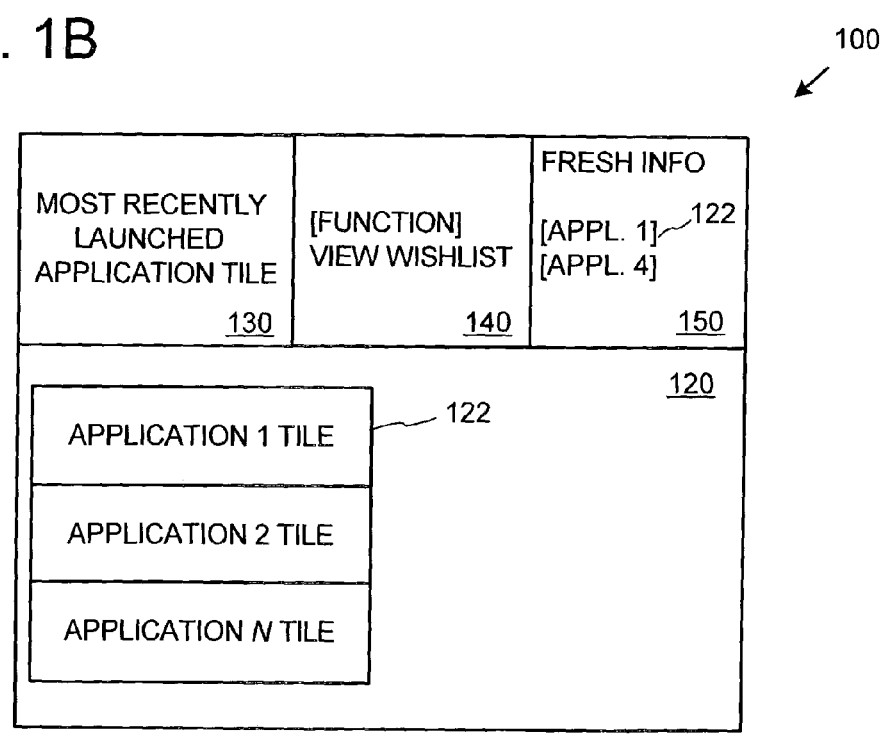

FIG. 1B shows a screen shot of another exemplary application-centric user interface 100. In the example, in addition to the two or more application tiles 122, there are the recent application pane 130, the task pane 140, and the information pane 150. An implementation may use one or more of the illustrated panes 130, 140, 150.

The most recently launched application pane 130 can show tiles for one or more (e.g., three) of the most recently launched applications. Or, some other mechanism can be used to denote the most recently launched application(s).

The task pane 140 presents one or more tasks that can be performed for the user interface, such as navigating to different pages within the user interface. Some tasks may be application-specific, while others may not operate on a particular application. In the example, a "view wish list" option is shown. When activated (e.g., by clicking), the "view wish list" option navigates to a page showing a list of one or more applications that a user has designated as being in a "wish list." For example, a user may be considering purchasing such applications or have already decided that such applications are desired and will be purchased upon release.

The information pane 150 can present one or more links 122, which when activated (e.g., by clicking), navigate to a detail page for the application indicated by the link. The links can be limited to those having fresh information, such as new information made available in the past n days (e.g., configurable by a user).

In any of the examples, areas of the user interface shown as panes may or may not be a visual boundary between the panes. Thus, the panes may alternatively be areas of the user interface without visual boundaries. Additional, fewer, or other items can be included. For example, a menu bar can present additional features or options.

Example 3—Exemplary Tiles

Figure 2A:
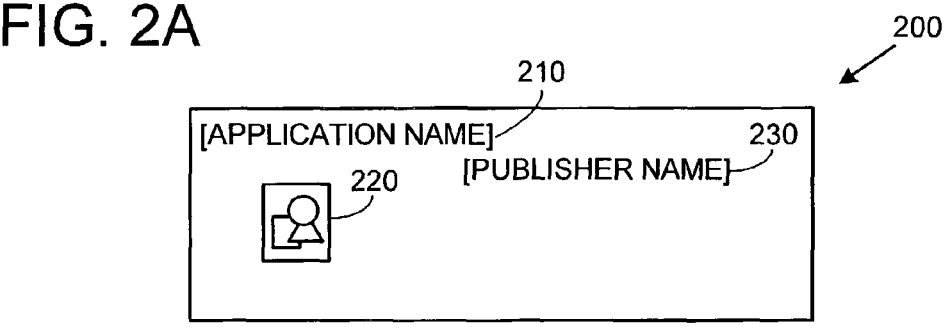
FIGS. 2A, 2B, 2C, and 2D are screen shots of exemplary application tiles for use in an application-centric user interface, such as the user interfaces of FIGS. 1A and 1B.

To facilitate a rich presence for applications in a user interface, the exemplary tiles described herein can present a graphical representation of an application and other information related to the application. FIG. 2A is a screen shot of an exemplary application tile 200 for use in an application-centric user interface, such as the user interfaces of FIGS. 1A and 1B. In the example, the application's name 210, a graphical (e.g., iconic, photographic, or artistic) representation 220 of the application, and a publisher name 230 are included in the tile 200. Alternatively, fewer, additional, or different items can be shown.

Figure 2B:
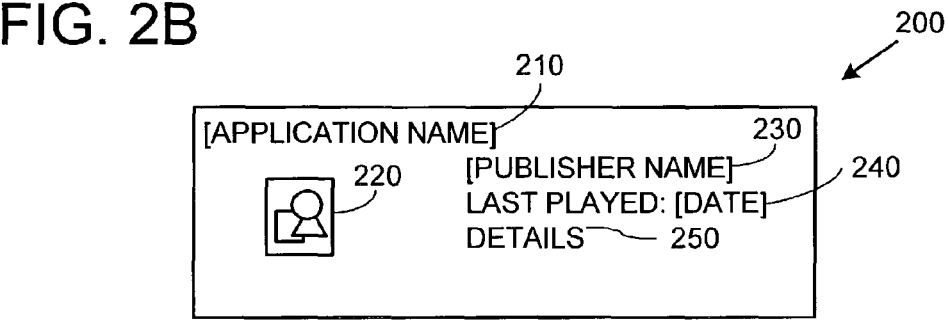

FIG. 2B is a screen shot of an alternative exemplary application tile 200 for use in an application-centric user interface, such as the user interfaces of FIGS. 1A and 1B. In the example, the application's name 210, a graphical (e.g., iconic, photographic, or artistic) representation 220 of the application, and a publisher name 230 are included in the tile 200. Also included is an indication of a date for the application (e.g., when the application was last run or when it was published) 240 and a link 250 to details (e.g., a detail page) of the application. Alternatively, fewer, additional, or different items can be shown.

Figure 2C:
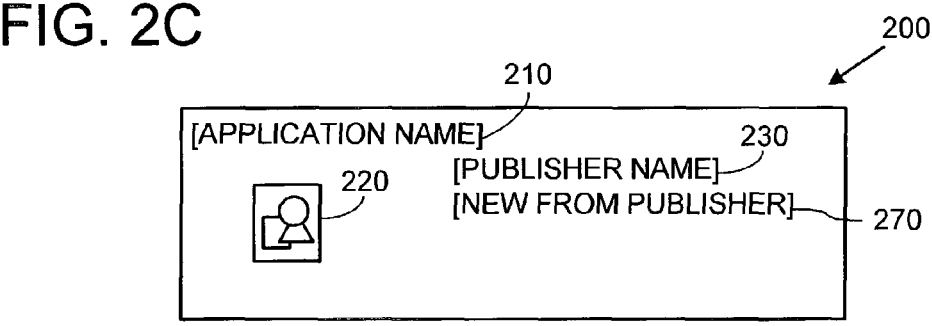

FIG. 2C is a screen shot of an alternative exemplary application tile 200 for use in an application-centric user interface, such as the user interfaces of FIGS. 1A and 1B. In the example, the application's name 210, a graphical (e.g., iconic, photographic, or artistic) representation 220 of the application, and a publisher name 230 are included in the tile 200. Also included is an information link 270 indicating that new information is available from the publisher of the application. Upon activation of the information link the new information can be presented. Alternatively, fewer, additional, or different items can be shown.

Figure 2D:
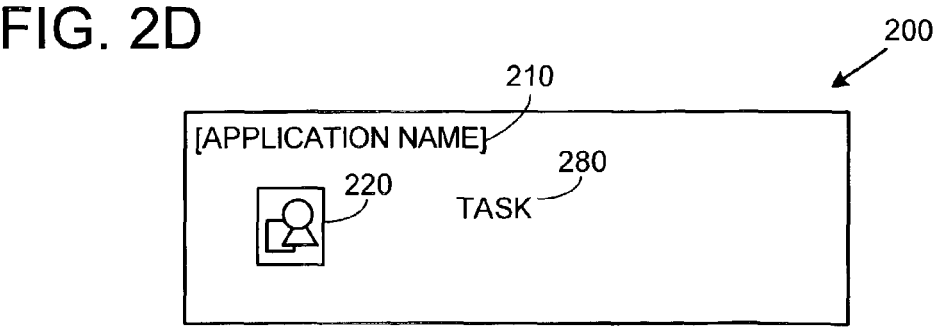

FIG. 2D is a screen shot of an alternative exemplary application tile 200 for use in an application-centric user interface, such as the user interfaces of FIGS. 1A and 1B. In the example, the application's name 210 and a graphical (e.g., iconic, photographic, or artistic) representation 220 of the application are included in the tile 200. Also included is an indication 280 of one or more tasks that can be performed for the application. Such an indication, when activated, initiates performance of the task. The indication 280 of a task can be included in any of the tiles described herein and can be used to initiate any of the tasks described herein. Alternatively, fewer, additional, or different items can be shown.

In any of the examples, activation (e.g., clicking or double clicking) of the graphical representation 220 can launch (e.g., execute) the respective application.

Example 4—Alternative Exemplary User Interface Presentations

Figure 3A:
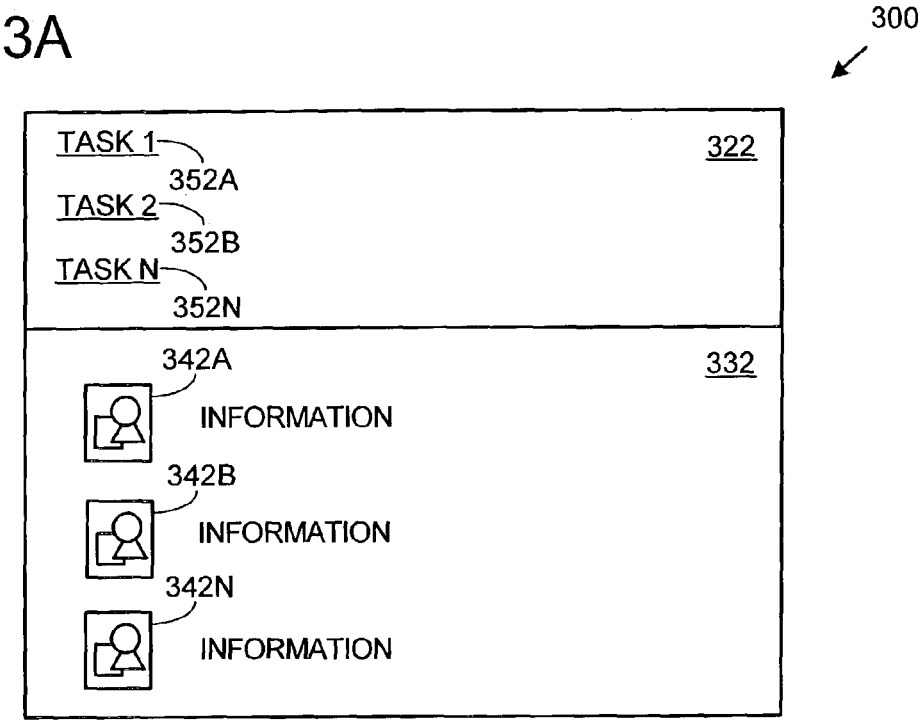
FIGS. 3A and 3B are screen shots of alternative exemplary application-centric user interfaces.

FIG. 3A shows a screen shot 300 of an alternative exemplary application-centric user interface. In the example, a task pane 322 shows one or more tasks 352A, 352B, 352N that can be performed on the applications represented by the representations 342A, 342B, 342N. For example, a user can select one of the applications 342A, 342B, 342N and then select a task 352A, 352B, 352N for the application (e.g., by clicking). Alternatively, fewer, additional, or different items can be shown. If desired, the items displayed in the pane 332 can be limited to representations of applications (e.g., representations of other items or files do not appear).

Figure 3B:
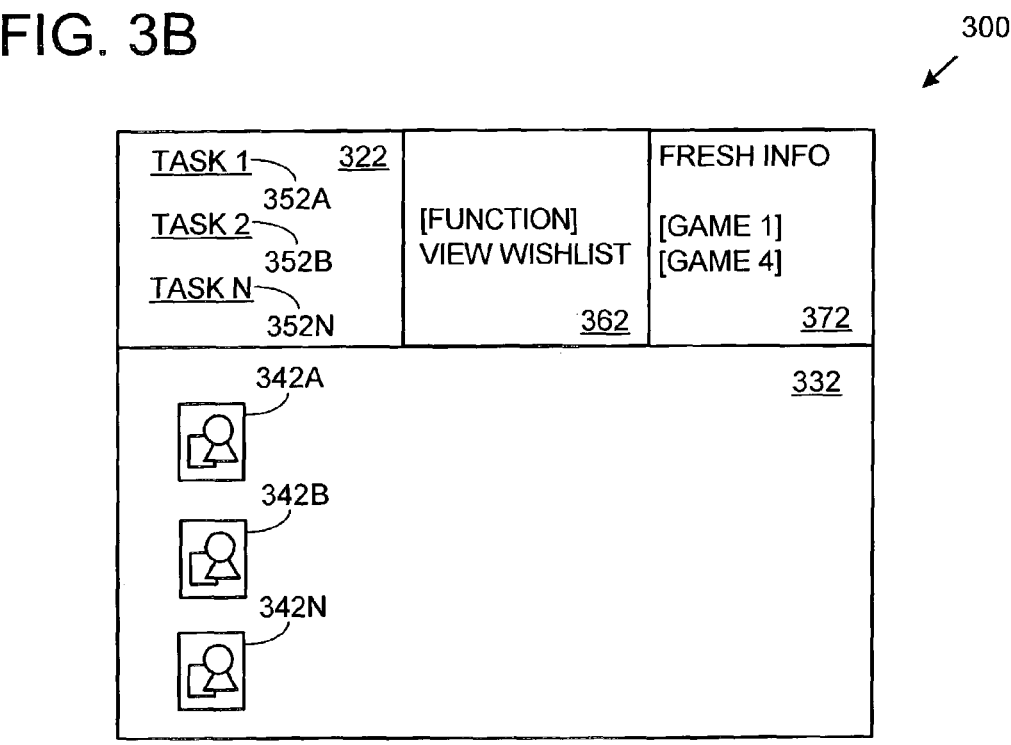

FIG. 3B shows a screen shot 300 of another alternative exemplary application-centric user interface. The example is similar to FIG. 3A, but also includes an activity center tasks pane 362 (e.g., similar to the task pane 140 of FIG. 1) and the information pane 372 (e.g., similar to the information pane 150 of FIG. 1).

In any of the examples, activation (e.g., clicking or double clicking) of the graphical representation 342A, 342B, 342N can launch (e.g., execute) the respective application. The representations 342A, 342B, 342N of the applications can be accompanied by information about the application (e.g., application name and the like). Alternatively, fewer, additional, or different items can be shown.

Example 5—Alternative Exemplary User Interface Presentations

Figure 4:
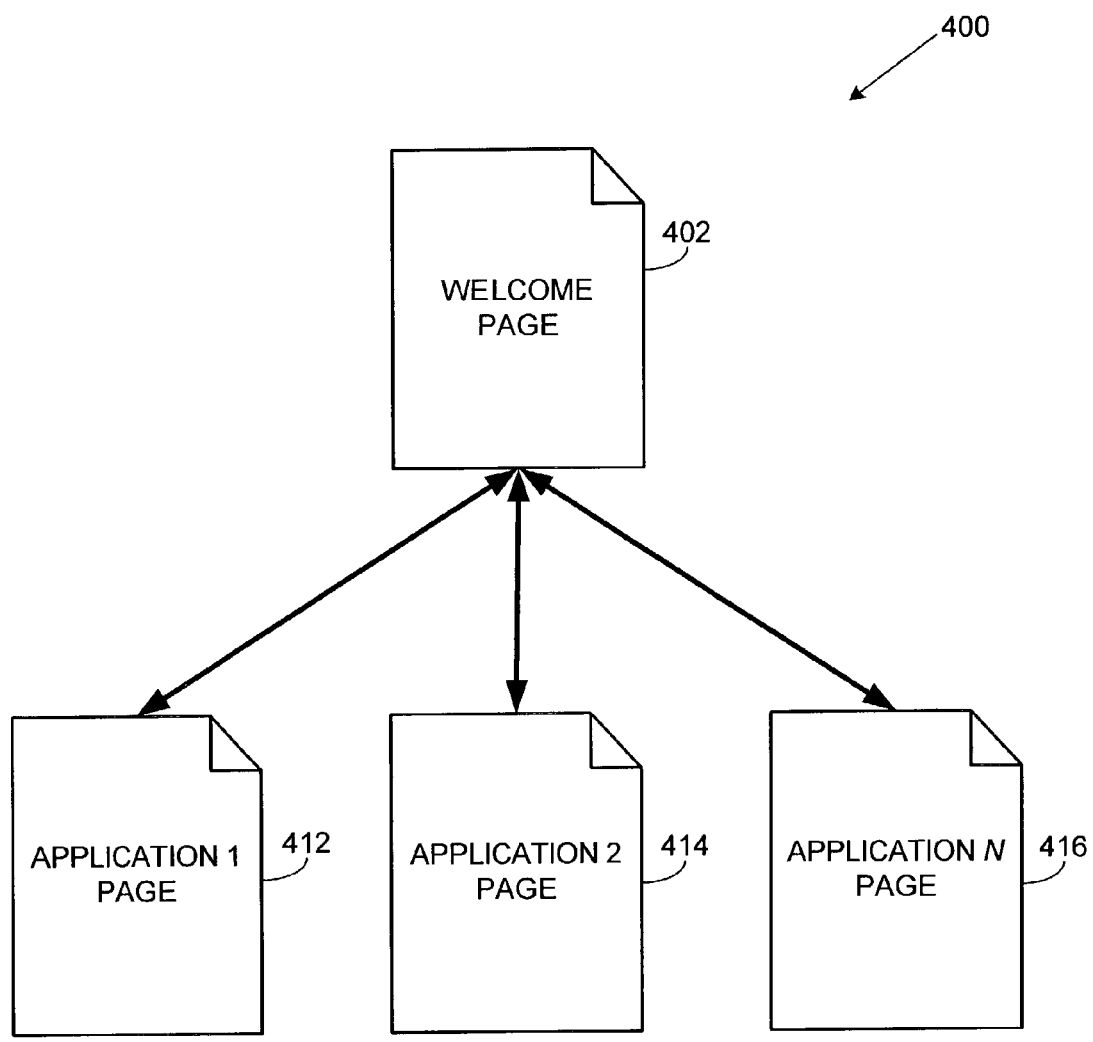
FIG. 4 is a block diagram showing relationships between pages in an application-centric user interface.

FIG. 4 is a block diagram showing relationships between pages in an application-centric user interface. For purposes of discussion, the user interface presentations 402, 412, 414, 416 are called "pages." When the application-centric user interface is first entered, a user is presented with the welcome page 402. Upon activating an item (e.g., the details item 250 of FIG. 2) for navigating to information about a particular application (e.g., an application detail page), the respective application page 412, 414, 416 is presented. The user can then navigate back to the welcome page 402 from any of the application pages 412, 414, 416 (e.g., by activating an item presented on the page 412, 414, 416). As shown, two or more application pages 412, 414, 416 can be included. Collectively, the pages are sometimes called an "application activity center" because various activities related to applications can be accomplished via the pages.

Additional pages not shown but possibly implemented include an application wish list. Further, few, or different pages can be implemented. The welcome page 402 can take the form of any of the application-centric user interfaces shown above (e.g., the interface 100 of FIG. 1).

Example 6—Exemplary Application Detail Pages

Figure 5A:
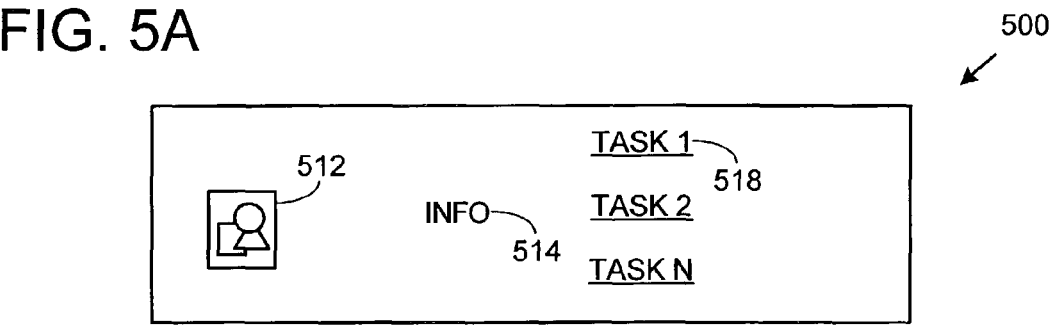
FIGS. 5A and 5B are screen shots of exemplary detail pages presenting information for an application.

FIG. 5A is a screen shot of exemplary detail page 500 presenting information for an application. Such a detail page 500 can be displayed when a detail page for a respective application is requested by a user (e.g., by activating the details item 250 of FIG. 2) and can be related to the welcome page 1902 as shown in FIG. 4). In the example, a representation (e.g., iconic, photographic, or artistic) of the application 512 is shown along with information 514 (e.g., application name) about the application. In addition, one or more task items 518 are shown. By activating a task item (e.g., by clicking on it), the associated task (e.g., any of the tasks described herein) is performed.

Figure 5B:
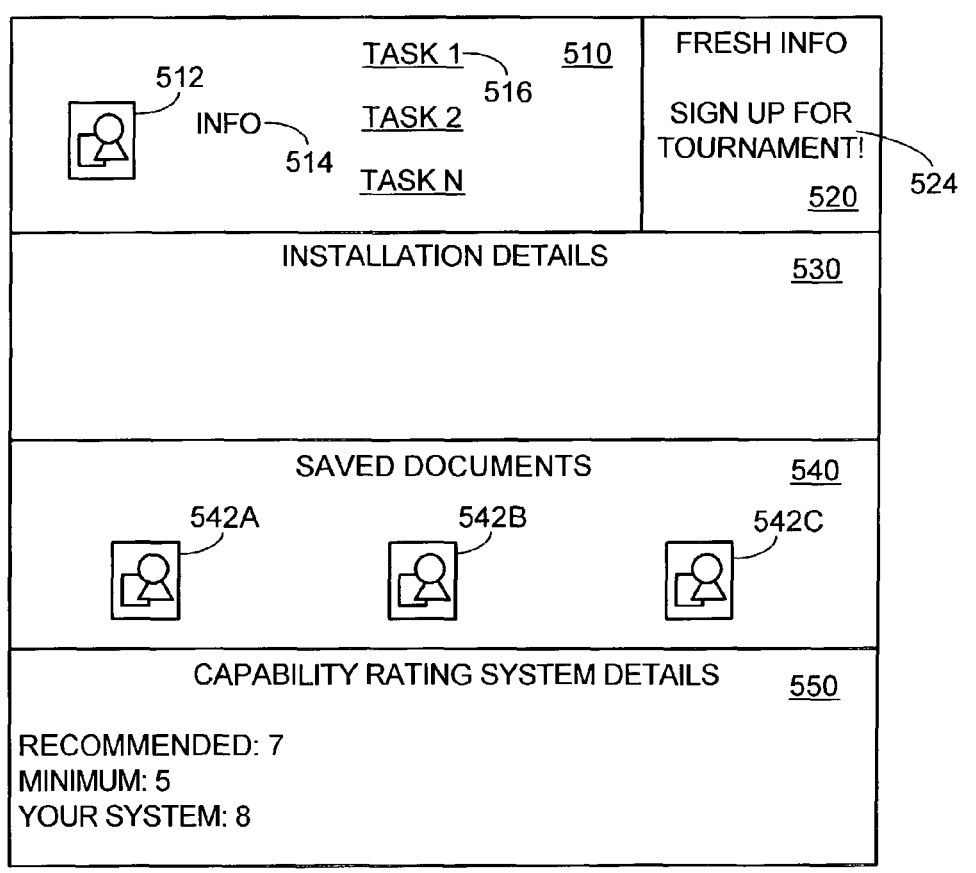
Figure 19:
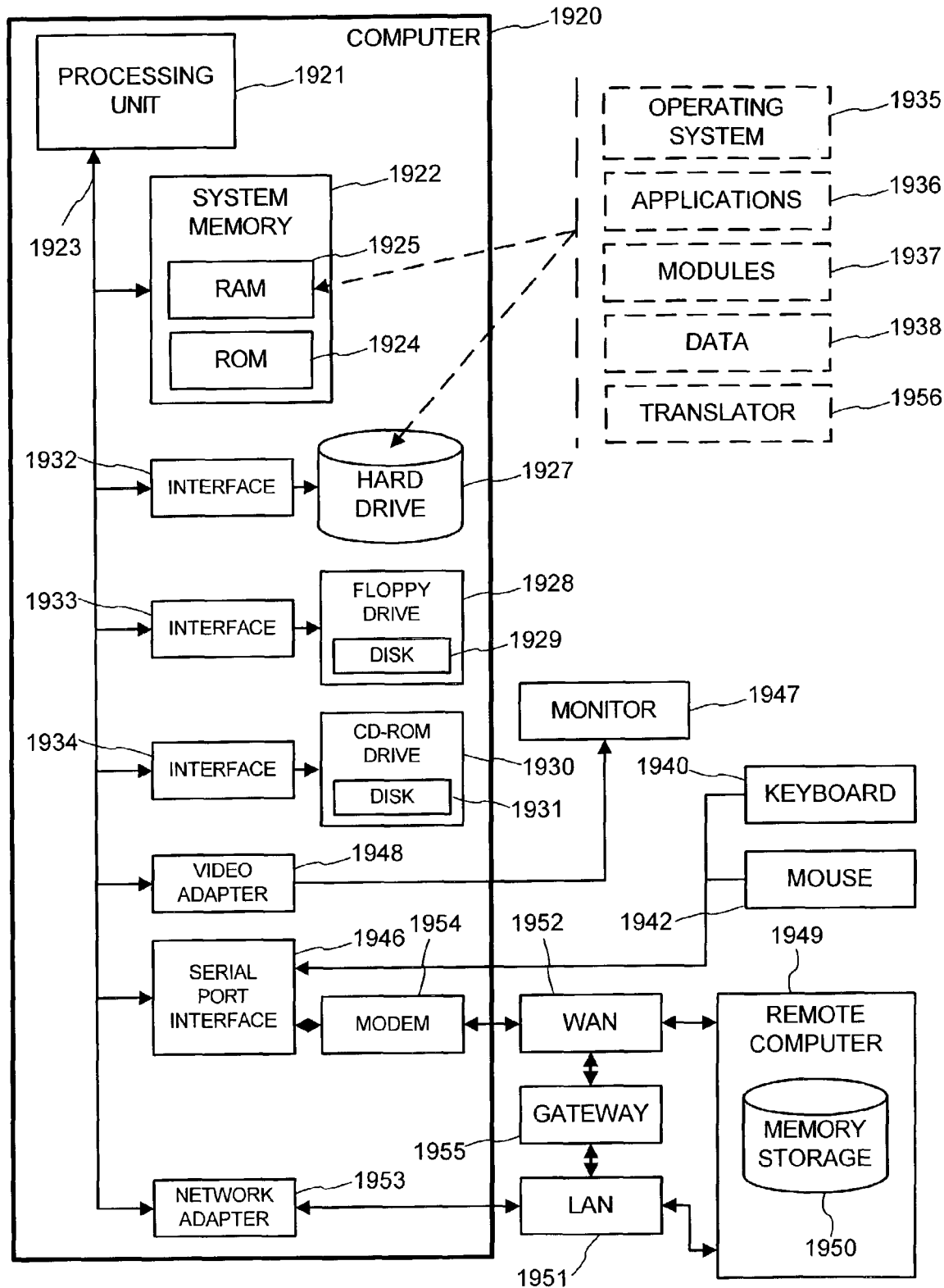
FIG. 19 is a block diagram showing an exemplary computer system.

FIG. 5B shows a screen shot of an alternative exemplary detail page 500 presenting information for an application. Such a detail page 500 can be displayed when a detail page for a respective application is requested by a user (e.g., by activating the details item 250 of FIG. 2) and can be related to the welcome page 1902 as shown in FIG. 19). The pane 510 shows various items functioning as described for FIG. 5B. In addition, the detail page 500 includes a fresh information pane 520 showing an information link 524, which, when activated, navigates to the indicated information.

In addition, the detail page 500 includes an installation details pane 530. For example, the program's file location, installation size, date installed, copyright information, preferred operating system, patch history, or some combination thereof can be displayed. Alternatively, fewer, additional, or different items can be shown. Application publishers can create additional custom categories, which may or may not include publisher-created object code modules that provide additional information relevant to the application for the user's benefit.

Also, the detail page 500 includes a saved documents pane 540, which has representations 542A, 542B, and 542C of saved documents for the application. Activation of the representation opens the document (e.g., and launches the application if appropriate).

Finally, in the example, the capability rating system details pane 550 shows the recommended capability rating for the application, the minimum capability rating for the application, and the user computer's capability rating. The capability rating gives an easily-understood rating roughly indicating the computing resources required to execute the application. In this way, a user can be forewarned that an application will not run or will not run well on the user computer.

In any of the examples, activation (e.g., clicking or double clicking) of the graphical representation 512 can launch (e.g., execute) the respective application.

Example 7—Exemplary Application-Centric User Interface in Operating System Shell Any of the user interfaces shown in the examples can be presented as part of a user interface for an operating system shell. For example, if the operating system shell depicts the file system of the computer, the user interfaces can be presented as a part of the file system.

Figure 6:
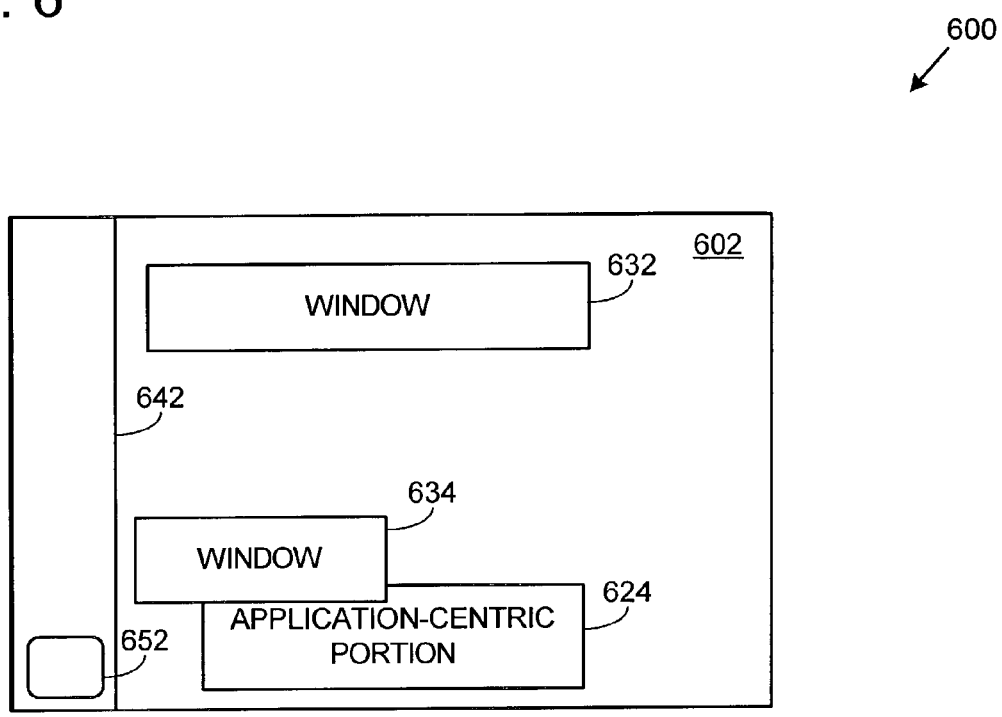
FIG. 6 is a screen shot of an exemplary application-centric user interface presented as part of a user interface for an operating system shell.

FIG. 6 is a screen shot of an exemplary application-centric user interface 624 presented as part of a user interface 600 for an operating system shell. In the example, an operating system shell presents the application-centric portion of the user interface 624 in a window on the desktop 602, along with a pane 642 and an activatable item 652.

The other windows 632, 634 may be presented by the operating system shell or by applications. The operating system shell may present other windows, such as those for navigating throughout the file system or configuring the operating system.

Figure 7:
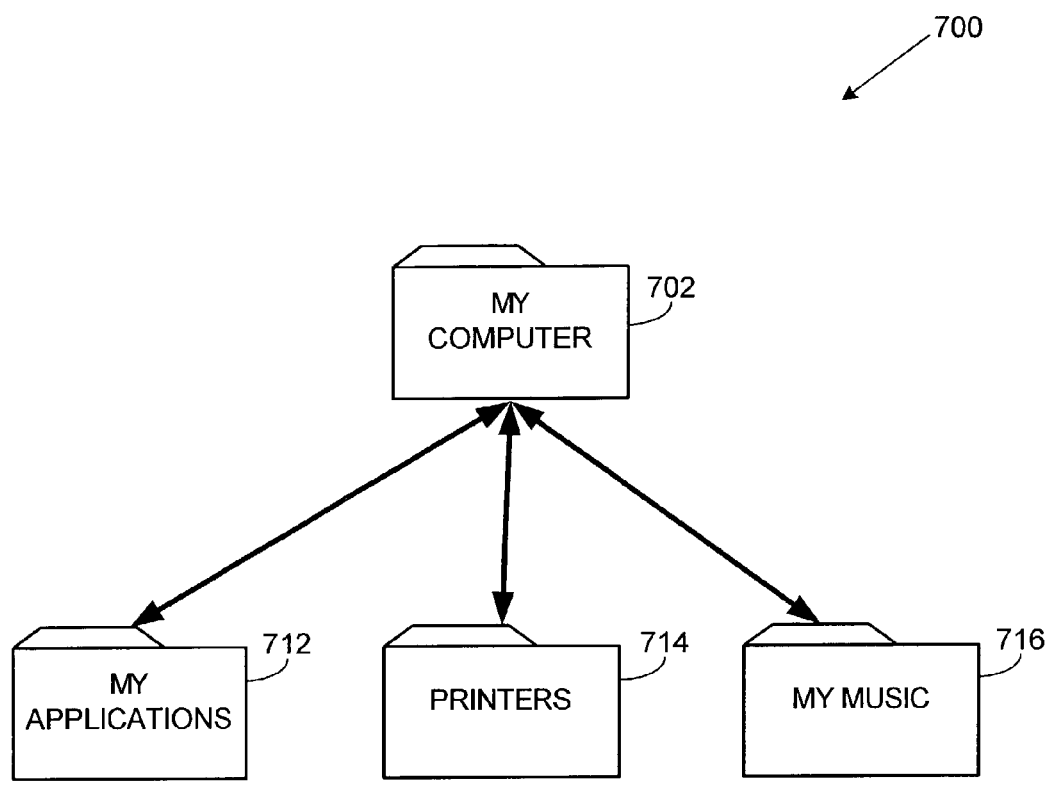
FIG. 7 is a block diagram showing relationships between folders presented as part of a user interface for an operating system shell.

Example 8—Exemplary Relationships of Application-Centric User Interface in Operating System Shell FIG. 7 is a block diagram 700 showing relationships between folders 702, 712, 714, 716 presented as part of a user interface by the operating system shell. In the example, a user can navigate from the "My Computer" folder 702 to the "My Applications" folder 712 or any of the other folders 714, 716. The folders can be customized per user, so that the operating system will present a different set of applications for each user. If desired, an application can be simultaneously installed across users so that it shows up in more than one user's folder.

In practice, the folders may be shown as iconic or list representations of the items in the folders, or in the case of the application folder 712, a more rich presentation can be presented as shown in any of the examples herein.

Example 9—Exemplary Application Metadata File

Figure 8:
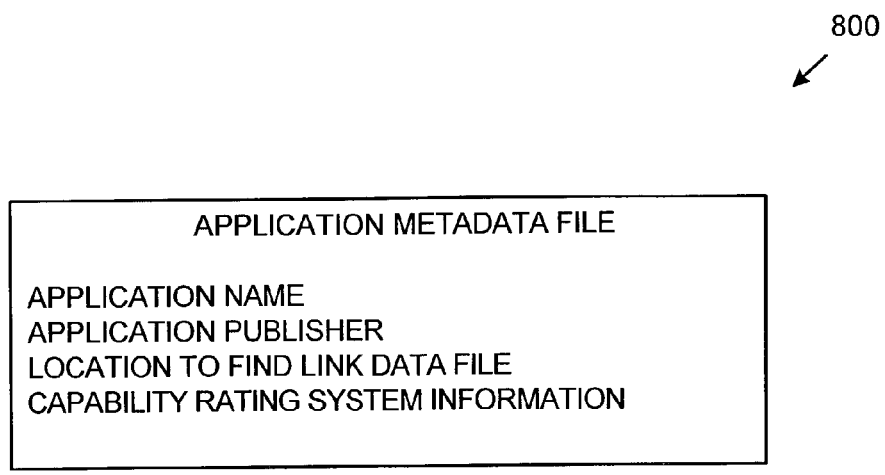
FIG. 8 shows contents of an exemplary application metadata file.

FIG. 8 shows contents of an exemplary application metadata file. The application metadata file can store information about an application and can be used when presenting the application's information in the application-centric user interface.

Thus, the file 800 can include the application's name, a name of the application's publisher, a location to find link data for presenting informational links, capability rating system information, references to graphical representations of the application, numerous other items, or some combination thereof.

If desired, the file 800 can follow mark-up (e.g., XML) conventions. The file 800 can be associated with a signature to authenticate origin and integrity of the file 800. Additionally, the file 800 can include information (e.g., hyperlinks) for previewing (e.g., acquiring a demo version) or purchasing the application.

Figure 9:
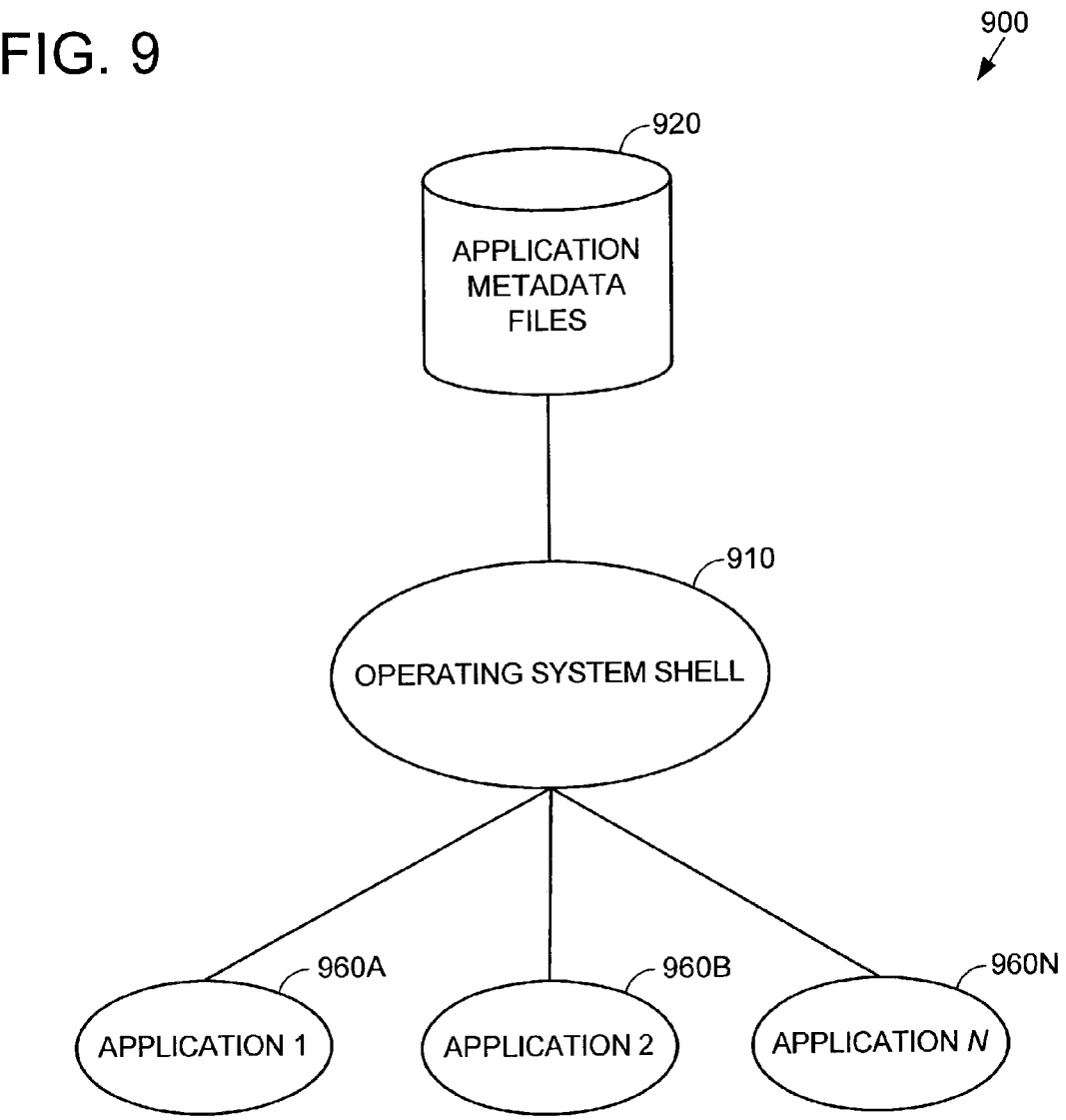
FIG. 9 is a block diagram showing relationships between an operating system shell, application metadata files, and applications.

Example 10—Exemplary Relationships Between an Operating System Shell, Application Metadata Files, and Applications FIG. 9 is a block diagram 900 showing exemplary relationships between an operating system shell 910, a database of application metadata files 920, and a plurality of applications 960A, 960B, 960N. The operating system shell 910 can thus present any of the user interfaces described herein by referring to the application metadata files 920 for the applications 960A, 960B, 960N. The shell can also configure and launch the applications 960A, 960B, 960N as desired via the selections received from a user at the user computer via the user interfaces.

Figure 10:
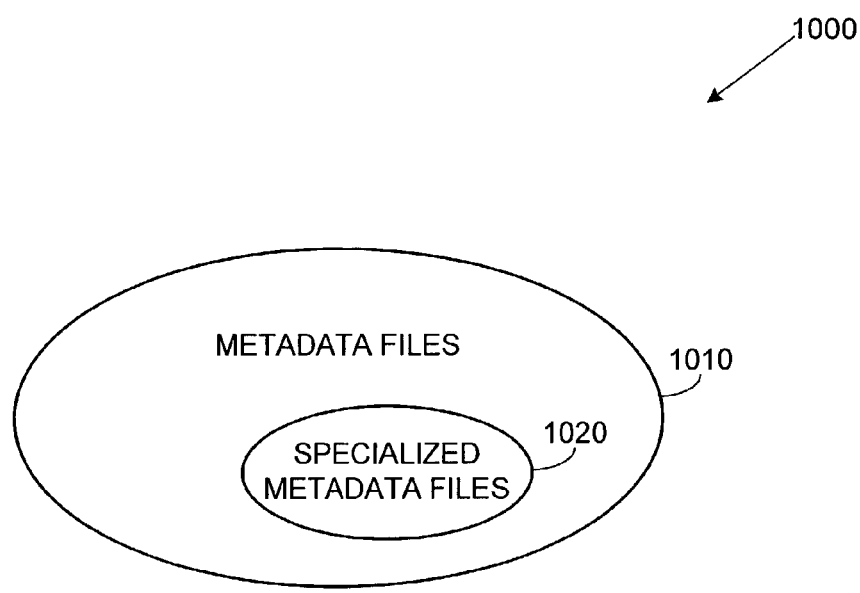
FIG. 10 is a Venn diagram showing relationships between application metadata files and specialized application metadata files.

Example 11—Exemplary Relationships Between Application Metadata Files and Specialized Metadata Files FIG. 10 is a Venn diagram 1000 showing relationships between application metadata files 1010 and specialized application metadata files 1020. For example, the specialized application metadata files can qualify as application metadata files (e.g., follow the same schema) but also include additional information specific to the specialized application (e.g., games).

Example 12—Exemplary Acquisition of Application Metadata Files

Application metadata files can be acquired in a variety of ways. For example, if an application is provided via a CD-ROM, the application metadata file can be stored thereon and copied therefrom. If an application is downloaded via a network connection, the file can be downloaded as part of the installation package. Or, as described herein, the application metadata file can be acquired without installing the application, such as when adding the application to a wish list or for an application hosted on a remote web site. In some cases, the application metadata file can be incorporated into or referred to by an application manifest. Such a manifest can be provided to indicate the items within a software package.

Figure 11:
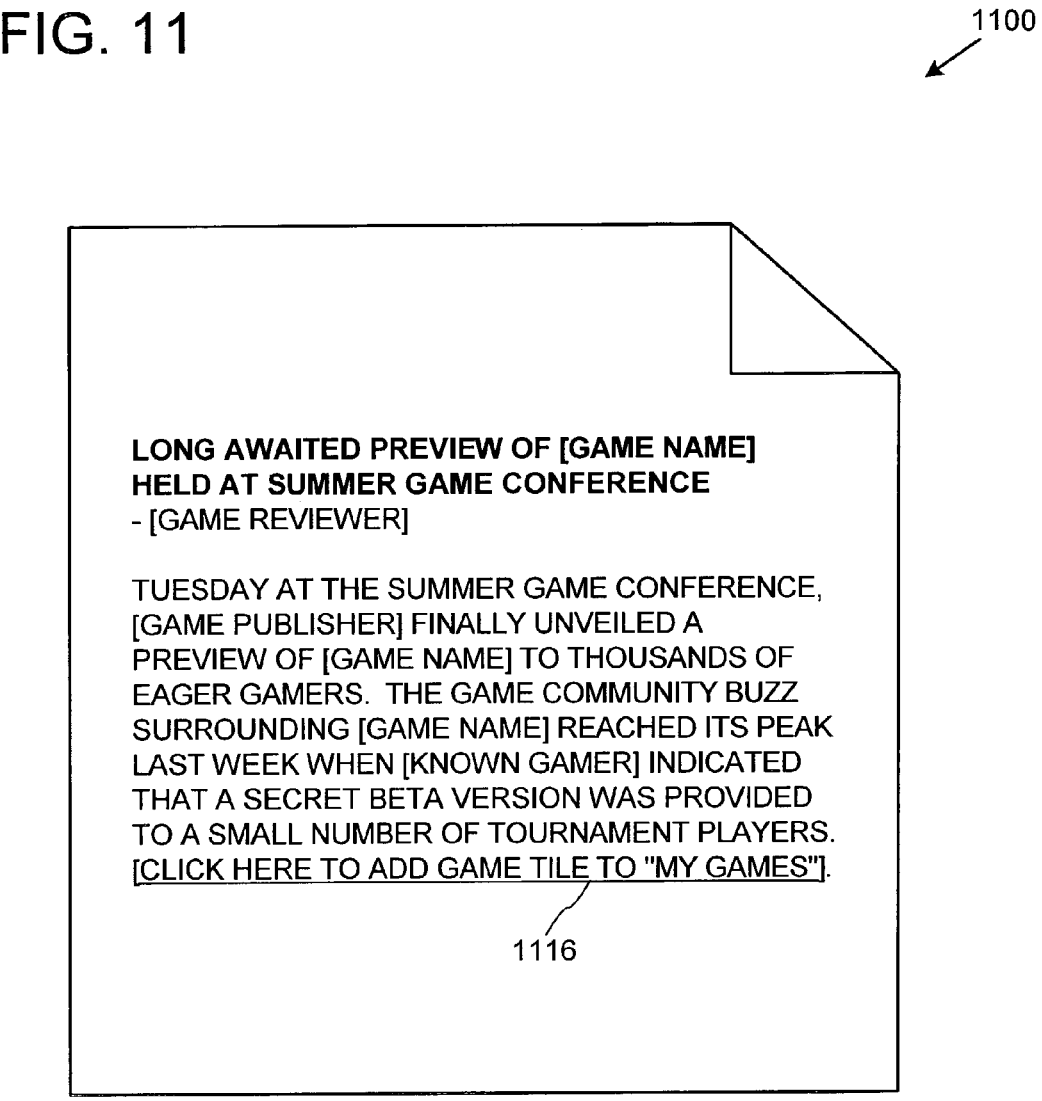
FIG. 11 is a screen shot of an exemplary review of an application from which a an application metadata file can be acquired.

FIG. 11 is a screen shot of an exemplary page 1100 (e.g., web page) having a review of an application from which an application metadata file can be acquired. In the example, a hyperlink 1116 is presented as part of the page 1100. Activation of the hyperlink 1116 results in acquisition of the application metadata file (e.g., the file is stored in the database 920 and added to a wish list).

The application metadata file can be identified by a special file extension (e.g., ADF, GDF) or other mechanism. An HTML tag in the hyperlink can indicate that the file is to be added to a wish list. The file can be accompanied by a digital signature so that the origin and integrity of the file can be authenticated.

Example 13—Exemplary Use of Metadata Files to Install Software

Figure 12:
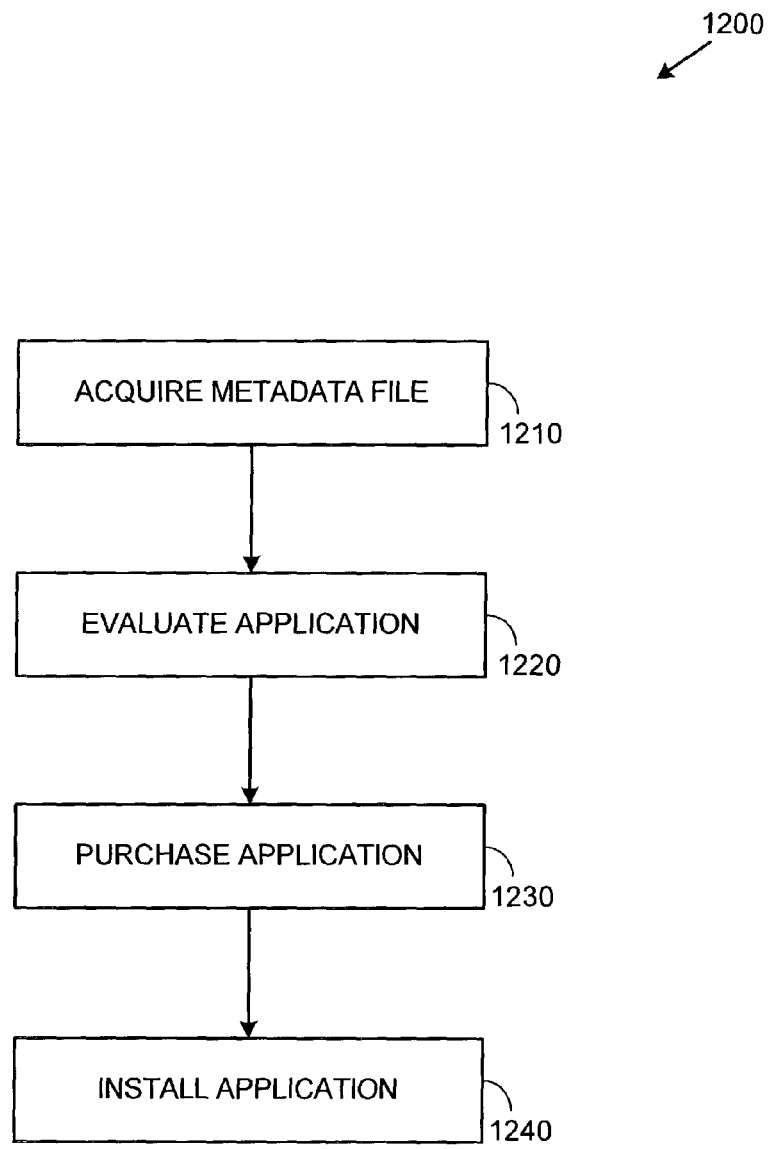
FIG. 12 is a flowchart showing an exemplary method for achieving application installation via an application metadata file.
Figure 13:
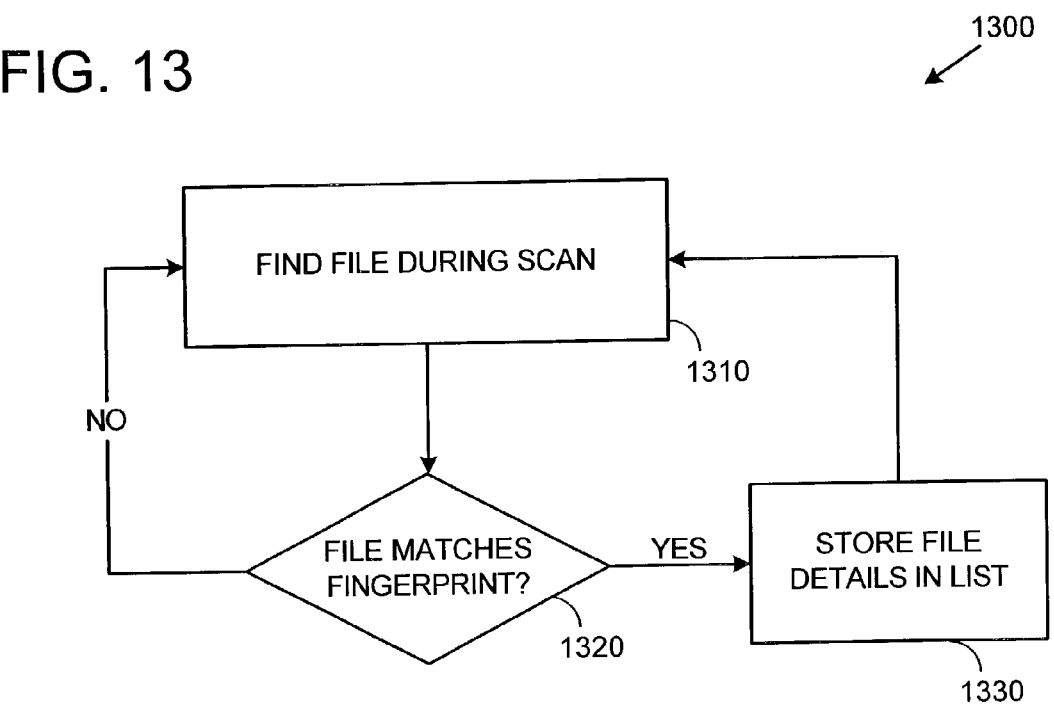
FIG. 13 is a flowchart showing an exemplary method for accommodating legacy applications in an application activity center.

Any of the application metadata files described herein can be used to install software. FIG. 12 shows an exemplary method 1200 for achieving application installation via an application metadata file.

At 1210, the application metadata file is acquired. As described herein, the file can be acquired in a variety of ways.

At 1220, the application is evaluated. The operating system shell can facilitate evaluation by a user by providing links to information about the application or the online community, even before the application has been purchased or installed.

At 1230, the application is purchased. Billing information for the application software purchase can be collected electronically, and the purchase can be achieved by activating (e.g., clicking) on an item, which can operate with reference to information in the respective application metadata file.

At 1240, the application is installed. Installation can proceed according to a variety of methods, including standard ones offered by the operating system.

The method 1200 can also be applied to upgrades. For example, an upgrade can be evaluated before purchasing. In some cases, an upgrade may be of such a nature as to be considered a separate application (e.g., a major upgrade).

The described method 1200 can also be described as a method for marketing software. By presenting the user with an easy way to add a representation of the application to the operating system shell before the software is purchased, the user can more easily become part of the online community related to the application. In this way, the user can collect relevant information when deciding whether or when to purchase the application or an upgrade. Further, the application publisher can keep in contact with the user via informational links. In this way, targeted online marketing can be achieved without deluging the online community with mass email campaigns.

Example 14—Exemplary Accommodation of Legacy Applications

Upon installation of an operating system shell supporting the described application-centric user interface techniques (e.g., when upgrading the operating system), there may be one or more applications already present on the computer. Such applications may not be present in the interfaces unless manually added by the user.

Such applications are sometimes called "legacy" applications. The user may be very interested in such applications, so if they do not appear in the proper user interfaces, the user may be disappointed and not take advantage of the functionality described herein.

To facilitate accommodation of legacy application, various methods can be used. FIG. 1300 shows one such method 1300. The method 1300 can be performed by the operating system in the background as other applications are running. Over time, the method 1300 can identify the applications on the computer. For example, if the operating system contains a routine that scans the files in the file system, the method 1300 can run as part of the operating system routine. Alternatively, the method 1300 can be run all at once.

At 1310, a file is found during a scan. Files considered can be limited to executables. Then, at 1320, it is determined whether the file matches a fingerprint stored as part of the operating system. A fingerprinting technique can be used so that the application is verified to be a particular application without its being an exact copy. If a match is indicated, details for the file (e.g., location and associated application metadata file name) can be stored in a list. Subsequently, the list can be considered (e.g., when an application activity center is launched or resumed), and the application metadata files can be added (e.g., after appropriate configuration, if any) to the database (e.g., the database 920).

The described fingerprints and associated application metadata files can be provided as part of the operating system, an operating system upgrade, or provided on a remote Internet resource, such as a web server. The latter case provides flexibility in providing ongoing updates to the database of information for legacy applications. For example, application metadata files can be generated for the more popular application titles so that they eventually appear in the application activity center. Any number of other techniques can be used.

Example 15—Exemplary Application to Games

Any of the technologies described herein can be applied with advantage to games. An activity center limited to games (e.g., not depicting other applications) can be implemented. Games can be accommodated via a specialized application metadata file. Such a file can include additional information about the game, such as how to achieve multiplayer online game scenarios.

Further, when implemented as part of a user interface for the operating system shell, a game activity center can provide an easy way for users to manage and launch games. For example, the operating system shell can present a "my games" folder by which the game activity center is presented. Still further, instant messaging functionality can be incorporated into the game activity center. And, if the operating system supports contact objects, multiplayer online games can be initiated via reference to the contact objects.

Various other game-specific functionality can be incorporated. For example, an application tile can include a link for playing the most recently saved game. In a detail page, the n (e.g., 3) most recently saved games can be portrayed graphically (e.g., via a mini screen shot depicting the game situation when it was saved).

Example 16—Exemplary Game Detail Page

Figure 14:
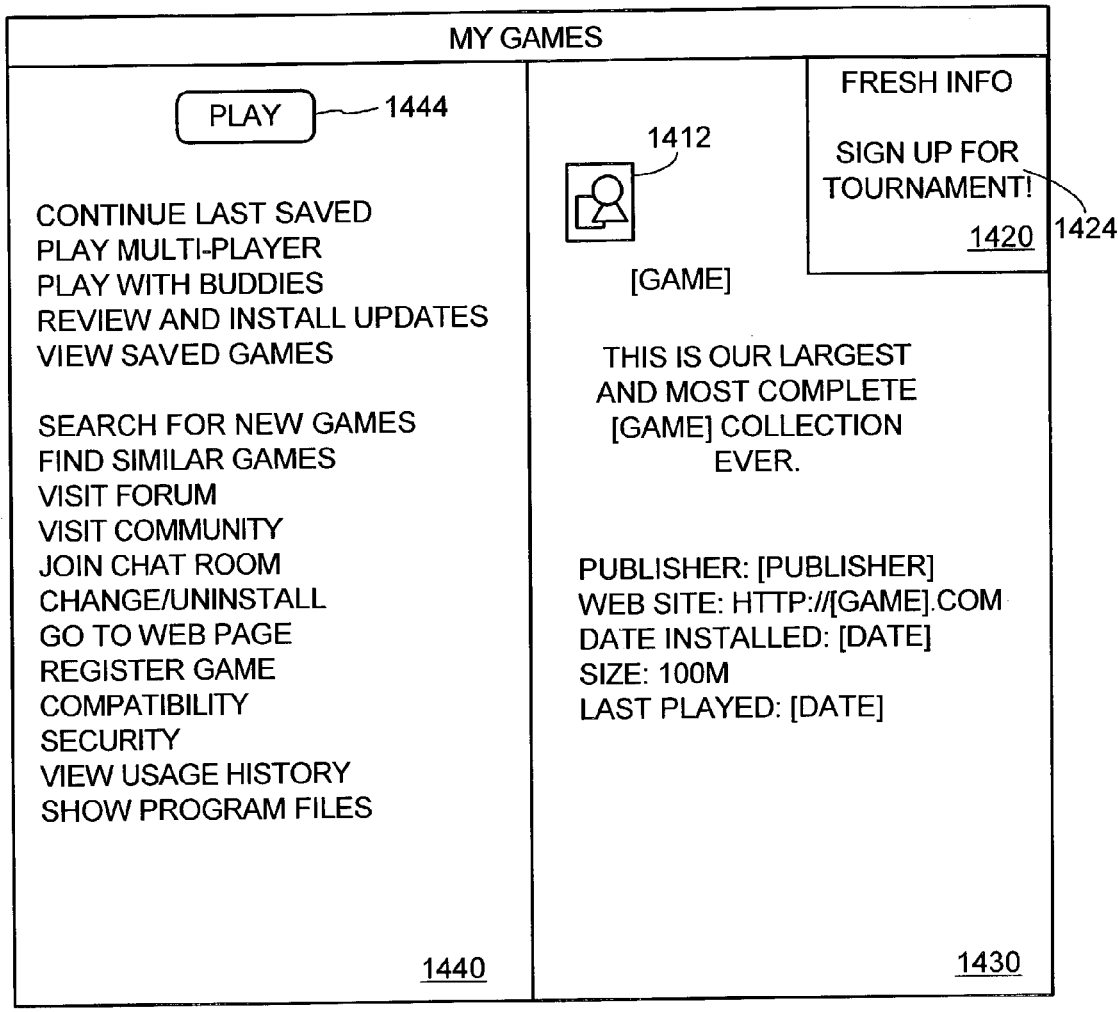
FIG. 14 is a screen shot showing an exemplary detail page for a game in a game activity center.

FIG. 14 is a screen shot showing an exemplary detail page 1400 for a game in a game activity center and can be used as an application detail page in any of the technologies described herein. In the example, a game detail pane 1430 includes a graphic (e.g., iconic, photographic, or artistic) representation 1412 of the game, the game's name, a comment from the publisher, the name of the publisher, the publisher's web site, the date the game was installed, the size of the game, and the date the game was last played. Such information can be stored in the game's metadata file (e.g., a specialized application metadata file) or otherwise stored or acquired. For example, certain often-changing information (e.g., date the game was installed and date the game was last played) can be stored outside the game's metadata file. The size of the game can be determined when the game is executed.

In addition, the pane 1430 includes an information links pane 1420, which includes an information link 1424, which, when activated (e.g., by clicking), navigates to the indicated information.

A task pane 1440 shows various tasks that can be achieved for the application (e.g., by activating the task item). For example, the game can be played by activating the button 1444. Other tasks include: continue the last saved game, play multi-player, play with buddies, review and install updates (e.g., upgrades or updates to data files), view saved games, search for new games, find similar games, visit an online forum for the game, visit an online community for the game, join an online chat room for the game, change or uninstall the game, go to the game's (official) webpage, check compatibility information for the game, check security information for the game, view usage history (e.g., when played, how long played, how often played), and show program files.

In practice, additional, fewer, or different items may be shown. In any of the examples, activation (e.g., clicking or double clicking) of the graphical representation 1412 can launch (e.g., execute) the respective application.

Example 17—Exemplary Multiplayer Online Game Scenario

Figure 15:
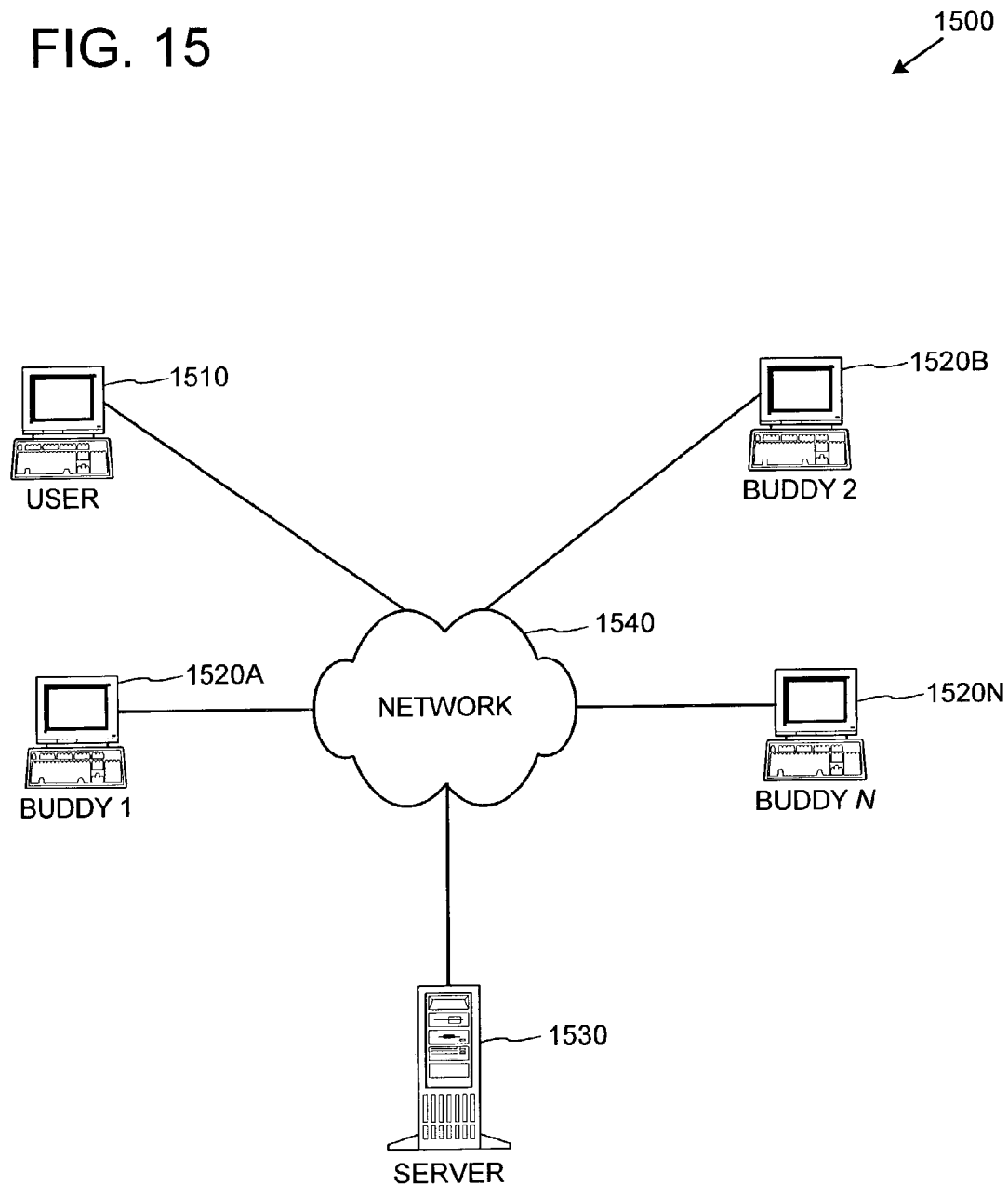
FIG. 15 is a block diagram showing an exemplary multiplayer online game scenario.

FIG. 15 shows a block diagram 1500 illustrating an exemplary multiplayer online game scenario. In the example, the user computer 1510, and one or more buddy computers 1520A, 1520B, 1520N are in contact with the game server 1560 via the network 1540. Respective human players can be at the user and buddy computers. In this way, the players can participate in the same game to compete or cooperate in the game. The number of users can far exceed that shown. In some scenarios, one of the user or buddy computers can serve as the game server.

Contact information for the buddy computers 1520A, 1520B, 1520N can be stored on a buddy list. When determining whether buddies are playing a particular game or any games, the list can be consulted. If desired, consent can be acquired before adding a contact to a buddy list.

Although multiplayer online games have become very popular, they can still remain somewhat difficult to start. Various technologies described herein can simplify multiplayer online game user interface operation.

Figure 16:
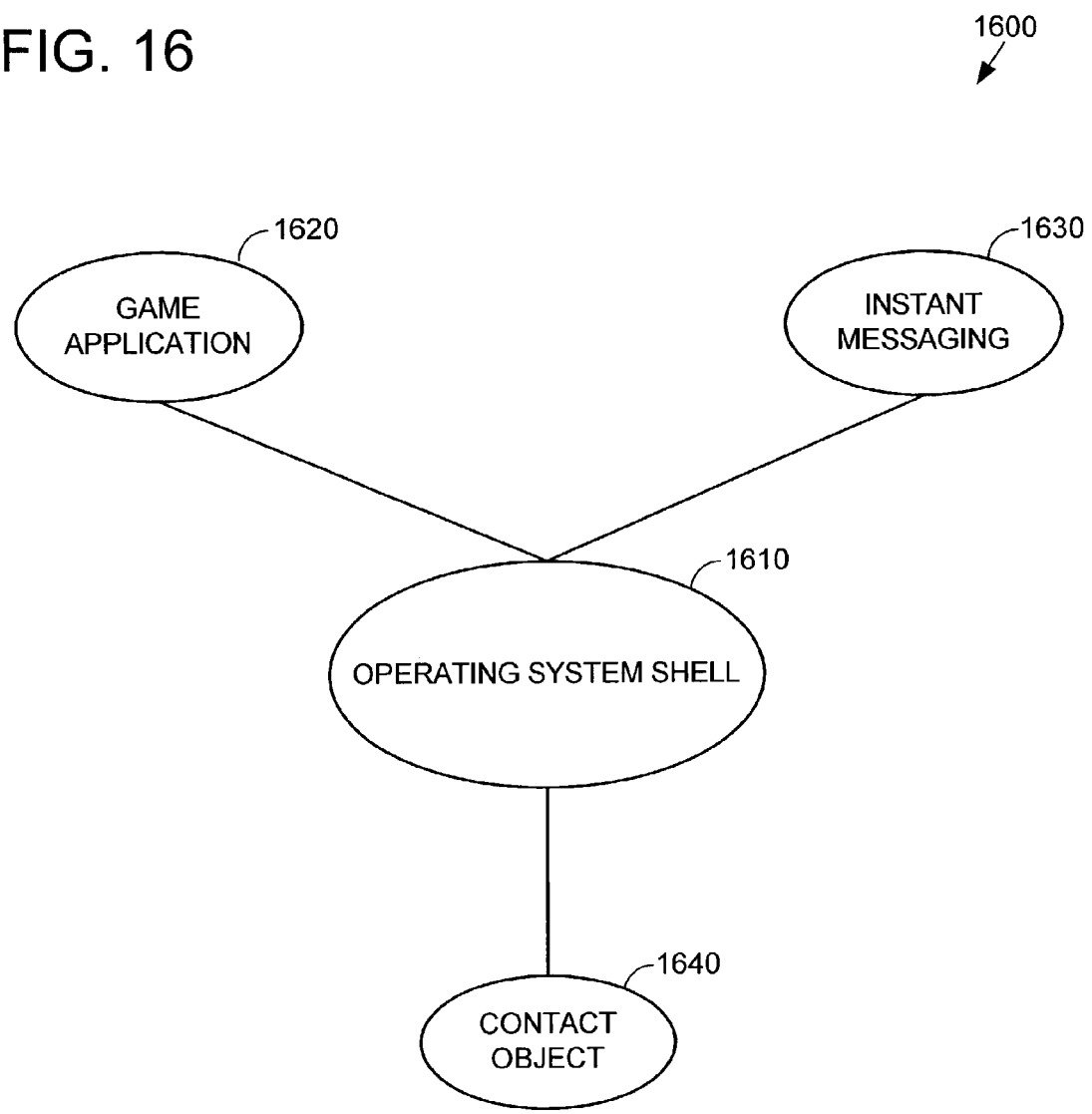
FIG. 16 is a block diagram showing exemplary relationships between instant messaging, the operating system shell, and a game application.

Example 18—Exemplary Relationships for Achieving Multiplayer Online Game Scenarios FIG. 16 is a block diagram showing exemplary relationships 1600 for achieving multiplayer online game scenarios. In the example, the operating system shell 1610 interfaces with instant messaging functionality 1630 and a game application 1620. Also, if desired, the operating system shell 1610 can interface with one or more contact objects 1640 (e.g., stored in a database accessible by the operating system shell 1610).

The operating system shell 1610 is operable to interface with a user (e.g., via the operating system shell or an interface for the instant messaging functionality 1630) to receive directions regarding multiplayer game scenarios. The shell 1610 can then provide appropriate information to the game application 1620 to initiate or join the multiplayer online game.

In some cases, a multiplayer online game can be initiated or joined via the contact object 1640 (e.g., a user interface depicting information about an individual, such as a friend or buddy).

Figure 17:
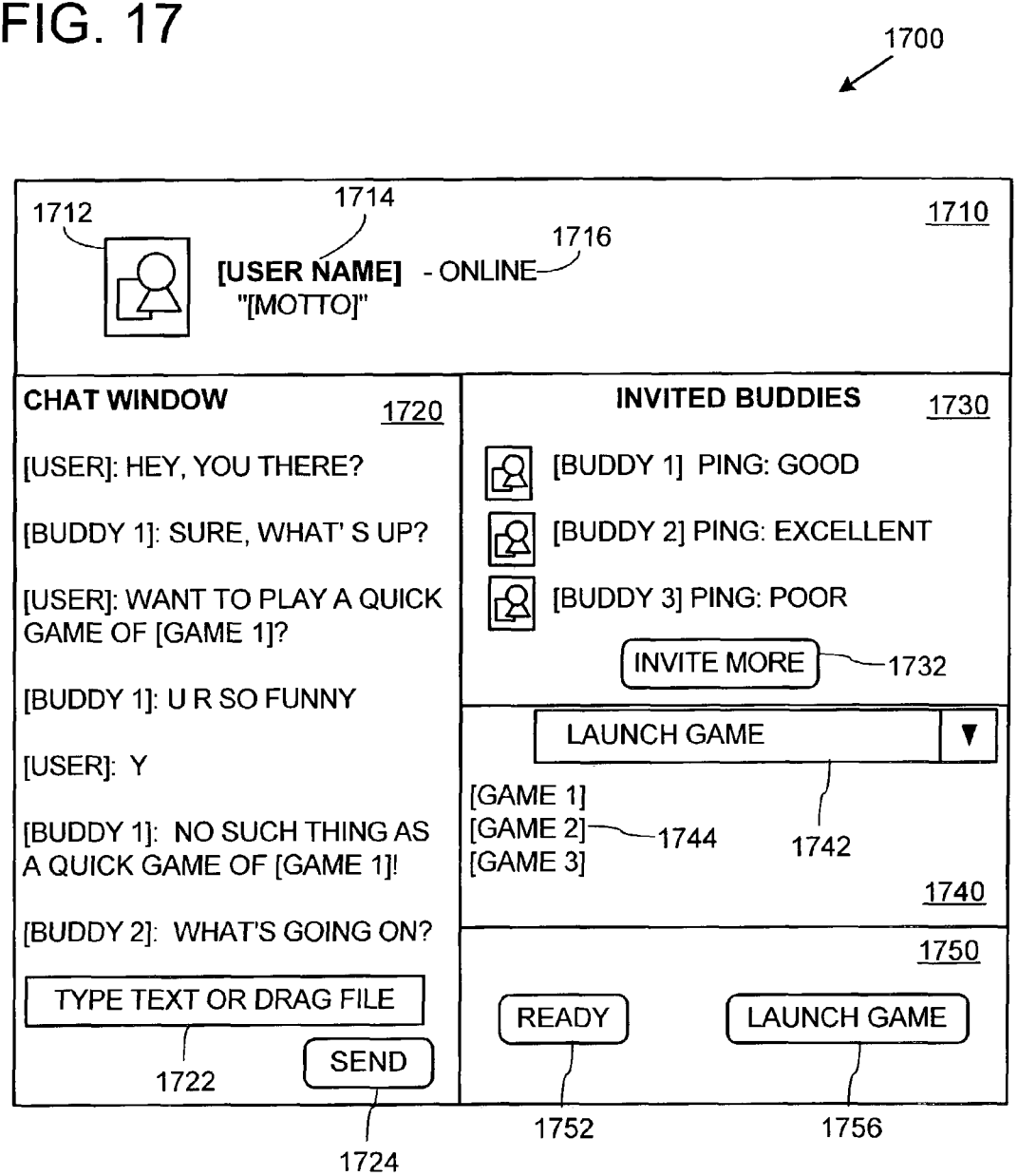
FIG. 17 is a screen shot of a user interface for achieving an exemplary multiplayer online game scenario, such as that shown in FIG. 15.

Example 19—Exemplary User Interface for Achieving Multiplayer Online Game Scenarios FIG. 17 is a screen shot of a user interface 1700 for achieving an exemplary multiplayer online game scenario, such as that shown in FIG. 15. In the example, the user interface 1700 includes a user pane 1710, which includes a depiction 1712 (e.g., photograph) of the user of the computer, the user's name 1714, an indication 1716 of whether the user is online or not, and a motto of the user (e.g., a brief message to identify the user's personality among buddies or newcomers).

The example also includes a chat pane 1720, whereby the user can hold an online chat session (e.g., via messenger functionality) with other potential players. Text can be entered into the box 1722 and the button 1724 activated to send a message via the chat session.

The invited buddies pane 1730 includes depictions (e.g., photographs) of those buddies (e.g., remote users) whom the user has invited to play. Also included is the buddy's name and a quality rating of the buddy's connection (e.g., indicative of whether a dialup or broadband connection is available for the buddy). Additional buddies can be invited via the button 1732. In the example, the user is hosting the game (e.g., controls who is invited to the game). Other scenarios are possible.

The example further includes a game pane 1740 which displays a function 1742 and a list of games 1744.

Finally, a ready button 1752 can be activated by the user (or buddies at their respective computers) to indicate that they are ready to begin playing. Upon pressing the launch button 1756, the game is begun with the displayed buddies in the buddy pane 1730. Information in the game metadata file can be consulted to determine how to launch the game (e.g., how to submit the buddies for the online game).

The user interface 1700 can be arrived at in a variety of ways. For example, a game detail page can present a link (e.g., "play multiplayer" or "play with buddies") which, when activated, presents the interface 1700. Or, the user may be chatting with a buddy via the messaging software and be presented with an option by which the user interface 1700 is presented. Finally, an option can be presented when showing a list of buddies (e.g., in a contact list represented by contact objects) by which the user interface 1700 is presented. The associated players can be automatically listed in the buddy pane 1730 if desired.

Before the interface 1700 is presented, another user interface can be presented (e.g., "Who do you want to play this game with") by which a user selects buddies. Such a user interface can present various contact-related options (e.g., "my contacts," "company directory," "family address book," "recent contacts," "cell phone contacts," filters, or some combination thereof).

Example 20—Exemplary Rich Presence Via Content Rating System

In any of the game examples described herein, games can be associated via content rating in a content rating system. For example, a game can be rated as acceptable for all audiences, or for mature audiences only. The system can accommodate various content rating conventions (e.g., from different countries).

A user (e.g., with an administrator password) can configure the system so that certain users are designated as to play games of only certain specified content ratings. For example, a parent can specify that a child can play only games rated for "all audiences."

Example 21—Exemplary Rich Presence Via Capability Rating System

In any of the examples described herein, applications can be associated with a capability rating system ("CRS"). For example, a higher rating can indicate that greater computing resources are needed to run the game. A minimum as well as a recommended capability rating can be specified for the application. The rating can be compared with a rating of the user computer to see whether the application will run or run well on the user computer.

Further, discrete system requirements can be specified for an application. For example, certain applications may require specialized hardware (e.g., a graphics tablet or a game controller).

Certain options can be not presented based on the requirements specified. In practice, a user will be permitted to launch an application even if it only meets the minimum system requirements.

The capability system rating can be presented for the application when it is added on a wish list. In this way, the user can easily determine whether or how well the application will run on the user computer.

Example 22—Exemplary Rich Presence for Applications

In any of the examples described herein, combinations of one or more of the following can be presented for the application (e.g., as part of the tile for an application, on the application's detail page, or both): System Requirements (e.g., CRS), installation details (e.g., install folder, size on disk, date installed), patch history (e.g., filtered for the application), and saved document summary.

Example 23—Exemplary Rich Presence for Games

When presenting games in any of the examples herein, the following additional items can be presented: online game(s) currently in progress, saved game summary and preferred input device assignment.

Example 24—Exemplary Rich Presence for Applications

When listing applications in any of the examples herein, the lists can be ordered by any of a variety of criteria (e.g., by name/alphabetical, by genre, by publisher, by most recently run, size on disk).

When presenting application tiles, the following can be included: link(s) to new publisher content available; link(s) to online forums; link(s) to fan sites. When presenting games, the following can be presented: a content rating, whether buddies are online, a list of buddies online, or some combination thereof. When presenting more than one game at a time, a summary of games for which updated information is available can be presented.

Example 25—Exemplary Application Tiles

For any of the application tiles shown herein, the tiles can include various information. The tiles can include any combination of the following information: date installed, release date (emphasize if on wish list), last run, hours run, publisher name and logo, developer name and logo, installation path, patch history, CRS data, update notification, extended description, screenshots, saved documents.

The tiles can include various items which, when activated, perform a task (e.g., the item behaves as a hyperlink or a command. Possible tasks include the following: find a new application, review and install updates, view system capabilities, check for updates, view my wish list, return to welcome page, run, continue last document, view saved documents, change/remove, find similar applications, visit forum, join chat room, register application, view usage history, show installation folder, check for updates for this application online, email a friend about this application, buy this application, download the demo.

In addition or alternatively, in implementations accommodating games, the following information can be included: saved games, last played, hours played, number of buddies playing. The following tasks can be included: configure parental controls, play, continue last saved game, play with buddies, join an internet or LAN game session, create a new Internet or LAN game, find a new game, view saved games, find similar games, register game online.

Example 26—Exemplary Game-Centric Implementations of Tiles

Figure 18A:
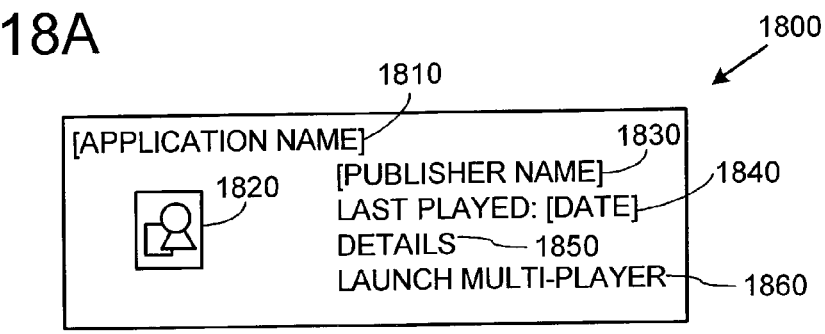
FIGS. 18A and 18B are shots of exemplary application tiles for use in a game-centric user interface, such as game-centric implementations of the user interfaces of FIGS. 1A and 1B.

FIG. 18A is a screen shot of an exemplary application tile 1800 for use in a game-centric user interface, such as game-centric versions the user interfaces of FIGS. 1A and 1B. In the example, the application's name 1810, a graphical (e.g., iconic, photographic, or artistic) representation 1820 of the application, and a publisher name 1830 are included in the tile 1800. In addition, the date last played 1840, a link 1850 to details (e.g., a detail page), and a task item 1860 for launching a multi-player online game are presented. Alternatively, fewer, additional, or different items can be shown.

Figure 18B:
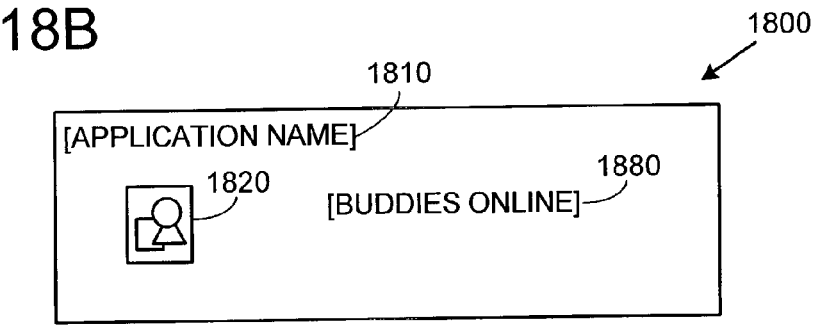

FIG. 18B is a screen shot of an alternative exemplary application tile 1800 for use in scenarios similar to that of FIG. 18A. The example includes an indication 1880 that buddies are online for the game. Alternatively, fewer, additional, or different items can be shown. For example, the task item 1860 could be included.

Example 27—Exemplary Software Update

When a user chooses to update or upgrade software, the functionality can be integrated with other update functionality on the computer. For example, if the computer's software (e.g., operating system) includes a download manager, the download manager can be invoked to acquire the update or upgrade.

Example 28—Exemplary Functionality

A wide variety of functionality can be achieved via the technologies described herein. In addition to those shown, a user can add an application, see a patch history for an application, and see upgrades or other applications.

Example 29—Exemplary Implementation of Application Metadata File

An application metadata file can include any information appropriate for achieving the user interfaces described herein. Table 1 shows exemplary fields in an application metadata file.

TABLE 1

Exemplary Application Metadata File Fields

| Tag | Description |
| --- | --- |
| ApplicationID | A unique identifier (e.g., a GUID) for a release. Next major version of the application gets a new ID |
| ProductFamily ID | An identifier (e.g., GUID) for a family of products. For example, MICROSOFT MONEY 2002 and MICROSOFT MONEY 2003 would have the same family ID, even if they have different application ID's. |
| ParentApplicationID | Used for application suites and expansion packs |
| Information | Block of metadata for users who do not yet have the application installed. Can be used in a "coming soon" presentation. |
| CommonTaskData | Information to activate common application tasks for the application. |

Example 30—Information Links

For those items of the user interface involving information links (e.g., the pane 150 of FIG. 1, the link 270 of FIG. 2, the information pane 372 of FIG. 3, the link 524 of the pane 520 in FIG. 5, and the information link 1424 of the pane 1420 of FIG. 14), the information links can be implemented according to the technologies described in U.S. patent application Ser. No. 10/401,620, Evans et al., "PROVIDING INFORMATION LINKS VIA A NETWORK," filed Mar. 27, 2003, which is hereby incorporated herein by reference and filed concurrently with the present application.

Example 31—Exemplary Computing Environment

FIG. 19 and the following discussion are intended to provide a brief, general description of a suitable computing environment for an implementation. While the technologies are described in the general context of computer-executable instructions of a computer program that runs on a computer and/or network device, the technologies may also be implemented in combination with other program modules. Generally, program modules include routines, programs, components, data structures, etc. that perform particular tasks or implement particular abstract data types. Moreover, the technologies may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 19, an exemplary system for implementation includes a conventional computer 1920

(such as personal computers, laptops, servers, mainframes, and other variety computers) includes a processing unit 1921, a system memory 1922, and a system bus 1923 that couples various system components including the system memory to the processing unit 1921. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1921.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1924 and random access memory (RAM) 1925. A basic input/output system (BIOS), containing the basic routines that help to transfer information between elements within the computer 1920, such as during start-up, is stored in ROM 1924.

The computer 1920 further includes a hard disk drive 1927, a magnetic disk drive 1928, e.g., to read from or write to a removable disk 1929, and an optical disk drive 1930, e.g., for reading a CD-ROM disk 1931 or to read from or write to other optical media. The hard disk drive 1927, magnetic disk drive 1928, and optical disk drive 1930 are connected to the system bus 1923 by a hard disk drive interface 1932, a magnetic disk drive interface 1933, and an optical drive interface 1934, respectively. The drives and their associated computer-readable media provide nonvolatile storage of data, data structures, computer-executable instructions, etc. for the computer 1920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1925, including an operating system 1935, one or more application programs 1936, other program modules 1937, and program data 1938; in addition to an implementation 1956.

A user may enter commands and information into the computer 1920 through a keyboard 1940 and pointing device, such as a mouse 1942. These and other input devices are often connected to the processing unit 1921 through a serial port interface 1946 that is coupled to the system bus, but may be connected by other interfaces, such as a parallel port, game port or a universal serial bus (USB). A monitor 1947 or other type of display device is also connected to the system bus 1923 via an interface, such as a video adapter 1948. In addition to the monitor, computers typically include other peripheral output devices (not shown), such as speakers and printers.

The computer 1920 operates in a networked environment using logical connections to one or more remote computers, such as a remote computer 1949. The remote computer 1949 may be a server, a router, a peer device or other common network node, and typically includes many or all of the elements described relative to the computer 1920, although only a memory storage device 1950 has been illustrated. The logical connections depicted include a local area network (LAN) 1951 and a wide area network (WAN) 1952. Such networking environments are commonplace in offices, enterprise-wide computer networks, intranets and the Internet.

When used in a LAN networking environment, the computer 1920 is connected to the local network 1951 through a network interface or adapter 1953. When used in a WAN networking environment, the computer 1920 typically includes a modem 1954 or other means for establishing communications (e.g., via the LAN 1951 and a gateway or proxy server 1955) over the wide area network 1952, such as the Internet. The modem 1954, which may be internal or external, is connected to the system bus 1923 via the serial port interface 1946. In a networked environment, program modules depicted relative to the computer 1920, or portions thereof, may be stored in the remote memory storage device. It will be appreciated that the network connections shown are exemplary and other means of establishing a communications link between the computers may be used.

Example 32—Exemplary Application Programming Interface

FIGS. 20-26 are a programming language excerpt 2000 specifying an exemplary application programming interface ("API") for achieving application installation via the technologies described herein. The described functions can be used, for example, when installing an application. Although the example proceeds with reference to computer games, the technologies can also be applied to applications in general.

Also, although the example code is in the C# language, any number of other programming languages can be used to implement an application programming interface. Further, the example shows that the applications are incorporated into the operating system shell via a folder named "My Games," however other folder names or way of incorporating into the operating system shell can be used.

Table 2 shows exemplary families of functions for an API, and Table 3 shows exemplary functions for an API. In the example, a "supported" title is a non-web, non-legacy title supported by the system; the web and legacy titles are still supported by the system. Additional, fewer, or different functions can be implemented.

TABLE 2

Exemplary API Function Families

| Function Family | Description |
| --- | --- |
| AddXXX | Install an application into "My Games" |
| UninstallXXX | Uninstall an application from "My Games" |
| IsXXXInstalled | Check to see if the specific application is installed in "My Games" |
| GetXXX | Return the list of applications in "My Games" |

TABLE 3

Exemplary API Functions

| Function | Description |
| --- | --- |
| AddLegacyTitle | Install a legacy application into the game activity center. |
| AddWebTitle | Install a web application into the game activity center. |
| AddSupportedTitle | Install a supported application into the game activity center. |
| GetMyGamesApps | Retrieves list of applications in the game activity center. |

TABLE 3-continued

Exemplary API Functions

| Function | Description |
| --- | --- |
| GetMyGamesSupportedApps | Retrieves list of supported applications in the game activity center. |
| GetMyGamesLegacyApps | Retrieves list of legacy applications in the game activity center. |
| GetMyGamesWebApps | Retrieves list of installed web applications in the game activity center. |
| IsAppInstalled | Checks to see if the specified app is installed in the game activity center as any kind of app. |
| IsLegacyTitleInstalled | Checks to see if the specified app is installed in the game activity center as a legacy app. |
| IsWebTitleInstalled | Checks to see if the specified app is installed in the game activity center as a web app. |
| UninstallWebTitle | Removes a web title from the game activity center. |
| UninstallSupportedTitle | Removes a supported title from the game activity center. |
| UninstallLegacyTitle | Removes a legacy title from the game activity center. |

Example 33—Exemplary Schema for Use with Application Metadata

FIGS. 27-31 specify an exemplary XML schema 2700 for use with application metadata. In the example, the metadata is stored in an "ADF" (e.g., a file with the .adf file extension).

In the example, the schema specifies that the metadata can include an application identifier identifying an application installable in an application activity center (e.g., "applicationid"), a displayable description of one or more tasks performable for the application when installed into the application activity center (e.g., "description" for "taskdata"), data indicating how to invoke the one or more tasks performable for the application when installed into the application activity center (e.g., "invokedata" for "taskdata"), and arguments for the one or more tasks performable for the application when installed in the application activity center (e.g., "arguments" for "taskdata"). Additional, fewer, or different elements can be defined for the schema.

Example 34—Exemplary Schema for Use with Computer Game Metadata

FIGS. 32-35 specify an exemplary XML schema 3200 for use with application metadata. In the example, the metadata is stored in a "GDF" (e.g., a file with the .gdf file extension) and extends the "ADF" schema of FIGS. 27-31. Additional, fewer, or different elements can be defined for the schema.

Example 35—Exemplary Schema for Use with Computer Game Metadata

FIGS. 36-38 specify an exemplary metadata 3600 for a particular game application called "Freecell." Metadata for other applications will differ accordingly.

Example 36—Exemplary Schema for Use with an Application Manifest

FIGS. 39-41 specify an excerpt of an exemplary XML schema for use with an application manifest. In the example, the manifest can specify application metadata by referring to an "ADF" or "GDF" file, such as one described in FIGS. 36-38 or any other application metadata file. By incorporating a reference to the metadata file in the manifest, the metadata file is considered part of the software package for the application and can be distributed therein. Additional, fewer, or different elements can be defined for the schema.

Alternatives

Having described and illustrated the principles of our invention with reference to various embodiments, it will be recognized that the embodiments can be modified in arrangement and detail without departing from such principles. It should be understood that the programs, processes, or methods described herein are not related or limited to any particular type of computer apparatus, unless indicated otherwise.

In any of the examples depicting user interfaces, such interfaces can be implemented as graphical user interfaces (GUIs). Although iconic representations of programs are shown, in any of the examples, box art (e.g., an apparent photograph of the physical box for the software) for the application can be used instead.

Although some examples are shown in general purpose computers, the technologies can be alternatively applied to console game scenarios.

Various types of general purpose or specialized computer apparatus may be used with or perform operations in accordance with the teachings described herein. Elements of the illustrated embodiment shown in software may be implemented in hardware and vice versa.

Techniques from one or more examples can be incorporated into any of the other examples.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method for generating an application-centric user interface, the method comprising:
   identifying a plurality of applications on a mobile device;
   displaying, in the application-centric user interface, a graphical representation for at least two or more of the applications in the plurality of applications;
   displaying a textual identifier for each of the displayed graphical representations adjacent to the respective graphical representation;
   receiving a first notification for a first application in the plurality of the applications;
   displaying a first notification indication for the first application in the application-centric user interface;
   receiving a second notification for a second application in the plurality of the applications; and
   displaying, concurrently with the display of the first notification indication, a second notification indication in the application-centric user interface.

2. The computer-implemented method of claim 1, wherein the application centric user interface is limited to graphical representations of applications and does not display representations of files.

3. The computer-implemented method of claim 1, wherein the first application and the second application are gaming applications.

4. The computer-implemented method of claim 1, further comprising:
receiving a selection of a graphical representation for the first application; and
in response to receiving the selection of the graphical representation for the first application, launching the first application.

5. The computer-implemented method of claim 1, wherein the graphical representation of the first application is a miniature screen shot in the form of an icon that depicts a user interface that represents a saved state of the computer-executable application.

6. The computer-implemented method of claim 1, wherein the application centric user interface is an operating system shell.

7. The computer-implemented method of claim 1, further comprising displaying a list of remote users that use the first application.

8. A system comprising:
at least one processor; and
memory operatively connected to the at least one processor, the memory storing instructions that when executed by the at least one processor cause the system to perform a set of operations comprising:
identifying a plurality of applications on a mobile device;
displaying, in the application-centric user interface, a graphical representation for at least two or more of the applications in the plurality of applications;
displaying a textual identifier for each of the displayed graphical representations adjacent to the respective graphical representation;
receiving a first notification for a first application in the plurality of the applications;
displaying a first notification indication for the first application in the application-centric user interface;
receiving a second notification for a second application in the plurality of the applications; and
displaying, concurrently with the display of the first notification indication, a second notification indication in the application-centric user interface.

9. The system of claim 8, wherein the application centric user interface is limited to graphical representations of applications and does not display representations of files.

10. The system of claim 8, wherein the first application and the second application are gaming applications.

11. The system of claim 8, wherein the operations further comprise:
receiving a selection of a graphical representation for the first application; and
in response to receiving the selection of the graphical representation for the first application, launching the first application.

12. The system of claim 8, wherein the graphical representation of the first application is a miniature screen shot in the form of an icon that depicts a user interface that represents a saved state of the computer-executable application.

13. The system of claim 8, wherein the application centric user interface is an operating system shell.

14. The system of claim 8, wherein the operations further comprise displaying a list of remote users that use the first application.

15. At least one computer storage device storing computer-executable instructions that, when executed by a computer, cause the computer to perform a method for generating an application-centric user interface, the method comprising:
identifying a plurality of applications on a mobile device;
displaying, in the application-centric user interface, a graphical representation for at least two or more of the applications in the plurality of applications;
displaying a textual identifier for each of the displayed graphical representations adjacent to the respective graphical representation;
receiving a first notification for a first application in the plurality of the applications; displaying a first notification indication for the first application in the application-centric user interface;
receiving a second notification for a second application in the plurality of the applications; and
displaying, concurrently with the display of the first notification indication, a second notification indication in the application-centric user interface.

16. The at least one computer storage device of claim 15, wherein the application centric user interface is limited to graphical representations of applications and does not display representations of files.

17. The at least one computer storage device of claim 15, wherein the first application and the second application are gaming applications.

18. The at least one computer storage device of claim 15, wherein the method further comprises:
receiving a selection of a graphical representation for the first application; and
in response to receiving the selection of the graphical representation for the first application, launching the first application.

19. The at least one computer storage device of claim 15, wherein the graphical representation of the first application is a miniature screen shot in the form of an icon that depicts a user interface that represents a saved state of the computer-executable application.

20. The at least one computer storage device of claim 15, wherein the application centric user interface is an operating system shell.

* * * * *